(12) United States Patent
Gao et al.

(10) Patent No.: US 11,893,226 B2
(45) Date of Patent: Feb. 6, 2024

(54) DISPLAY METHOD, GRAPHICAL INTERFERENCE, AND RELATED APPARATUS

(71) Applicant: Honor Device Co., Ltd., Shenzhen (CN)

(72) Inventors: Bolun Gao, Shenzhen (CN); Ruilin Quan, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/247,228

(22) PCT Filed: May 9, 2022

(86) PCT No.: PCT/CN2022/091730
§ 371 (c)(1),
(2) Date: Mar. 29, 2023

(87) PCT Pub. No.: WO2022/252926
PCT Pub. Date: Dec. 8, 2022

(65) Prior Publication Data
US 2023/0376192 A1 Nov. 23, 2023

(30) Foreign Application Priority Data
Jun. 4, 2021 (CN) .......................... 202110627641.X

(51) Int. Cl.
*G06F 3/0486* (2013.01)
*G06F 3/04817* (2022.01)
*G06F 3/0482* (2013.01)
*G06F 3/0488* (2022.01)

(52) U.S. Cl.
CPC .......... *G06F 3/0486* (2013.01); *G06F 3/0482* (2013.01); *G06F 3/0488* (2013.01); *G06F 3/04817* (2013.01); *G06F 2203/04803* (2013.01)

(58) Field of Classification Search
CPC .. G06F 3/0486; G06F 3/04817; G06F 3/0482; G06F 3/0488
See application file for complete search history.

(56) References Cited

U.S. PATENT DOCUMENTS

| | | | | |
|---|---|---|---|---|
| 6,850,256 B2 * | 2/2005 | Crow | ...................... | G11B 20/10 715/801 |
| 8,762,882 B2 * | 6/2014 | Ikeda | .................. | H04N 1/00453 715/837 |
| 9,191,486 B2 * | 11/2015 | Tseng | ................ | H04M 1/72436 |

(Continued)

FOREIGN PATENT DOCUMENTS

| CN | 110622487 A | 12/2019 |
|---|---|---|
| CN | 110704145 A | 1/2020 |

*Primary Examiner* — Tadesse Hailu
(74) *Attorney, Agent, or Firm* — Conley Rose, P.C.

(57) ABSTRACT

A display method, a graphical interface, and a related apparatus. In the method, when an electronic device detects, in a process of detecting an operation of dragging an identifier of to-be-shared content to a target identifier, that an identifier before the target identifier disappears, the electronic device may maintain a position of the target identifier in a display screen unchanged, so that a user drags the identifier of the to-be-shared content to the target identifier and releases the same, to send the to-be-shared content to a device corresponding to the target identifier.

20 Claims, 24 Drawing Sheets

(56) References Cited

U.S. PATENT DOCUMENTS

| | | | | |
|---|---|---|---|---|
| 9,374,354 | B2* | 6/2016 | Shin | G06F 21/305 |
| 10,437,378 | B2* | 10/2019 | Jang | G06F 3/04883 |
| 11,249,635 | B2 | 2/2022 | Ye | |
| 2015/0177937 | A1* | 6/2015 | Poletto | G06F 3/167 |
| | | | | 715/739 |
| 2015/0324605 | A1* | 11/2015 | Yoon | H04L 67/06 |
| | | | | 726/28 |
| 2015/0356949 | A1* | 12/2015 | Kim | H04W 4/18 |
| | | | | 345/173 |
| 2016/0210014 | A1* | 7/2016 | Liu | G06F 3/04886 |
| 2016/0259528 | A1* | 9/2016 | Foss | G06F 3/0488 |
| 2016/0357423 | A1* | 12/2016 | Fang | G06F 3/0482 |
| 2019/0037611 | A1* | 1/2019 | Renn | G06F 3/04883 |
| 2022/0345434 | A1* | 10/2022 | Rhazi | G06F 3/0484 |

* cited by examiner

DISPLAY METHOD, GRAPHICAL INTERFERENCE, AND RELATED APPARATUS

CROSS-REFERENCE TO RELATED APPLICATIONS

This application is a U.S. National Stage of International Application No. PCT/CN2022/091730 filed on May 9, 2022, which claims priority to Chinese Patent Application No. 202110627641.X, filed with the China National Intellectual Property Administration on Jun. 4, 2021, both of which are incorporated herein by reference in their entireties.

TECHNICAL FIELD

This application relates to the field of terminals, and in particular, to a display method, a graphical interface, and a related apparatus.

BACKGROUND

With the continuous development of wireless terminal technologies, people are more and more inclined to share information with others through the network. In particular, when an electronic device displays a content region and a sharing region, a user selects to-be-shared content in the content region, drags the to-be-shared content to a target identifier in the sharing region and releases the same, to share the to-be-shared content to a device corresponding to the target identifier. However, when the user drags the to-be-shared content to the target identifier and releases the same, another identifier before the target identifier may suddenly disappear, and a display position of the target identifier may automatically move forward in this case. As a result, the user may share the to-be-shared content to a device corresponding to a non-target identifier.

How to enable the user to accurately share the to-be-shared content to the device corresponding to the target identifier is an urgent problem to be solved.

SUMMARY

Disclosed in this application are a display method, a graphical interface, and a related apparatus. In the method, when an electronic device detects, in a process of receiving an operation of dragging an identifier of to-be-shared content to a target identifier, that an identifier before the target identifier disappears, the electronic device may maintain a position of the target identifier in a display screen unchanged, so that a user drags the identifier of the to-be-shared content to the target identifier and releases the same, to send the to-be-shared content to a device corresponding to the target identifier.

According to a first aspect, this application provides a display method. The method is applied to an electronic device, and includes: finding, by the electronic device, a plurality of devices within a first time period; displaying, by the electronic device, a first window and a second window, where an identifier of to-be-shared content is displayed in the first window, identifiers corresponding to the plurality of devices are displayed in the second window, and the identifiers of the plurality of devices are displayed in the second window in a preset order: the identifiers of the plurality of devices includes a first identifier and a second identifier; the electronic device displays the first identifier at a first position in the second window, and then displays the second identifier at a second position in the second window; detecting, by the electronic device, a first operation of dragging the identifier of the to-be-shared content to the second window; detecting, by the electronic device in the process of receiving the first operation, that a distance between the second identifier and the identifier of the to-be-shared content is less than a first value, detecting a second operation on the second identifier, and sharing the to-be-shared content with a device corresponding to the second identifier in response to the second operation; and controlling, by the electronic device within a second time period a moment when the electronic device stops the display of the first identifier to a moment when the electronic device detects the second operation, a display position of the second identifier in the second window to remain unchanged or displacement of a display position to be less than a second value.

During implementation of the method according to the first aspect, in a process in which a user performs a dragging and sharing operation, if the electronic device detects that an identifier before a target identifier disappears, a display position of the target identifier still remains unchanged, so that the user may succeed in dragging an identifier of to-be-shared content to the target identifier for releasing, to send the to-be-shared content to a device corresponding to the target identifier, thereby improving user experience.

With reference to the first aspect, in an implementation, the detecting, by the electronic device, that a distance between the second identifier and the identifier of the to-be-shared content is less than a first value specifically includes: detecting, by the electronic device, that a degree of overlap between a first hot zone and a second hot zone is greater than a third value, where the first hot zone is a region in which the identifier of the to-be-shared content is displayed; and the second hot zone is a region in which the second identifier in the second window is displayed.

In this case, the method for the electronic device to determine the target identifier based on the degree of overlap between the hot zones better conforms to user's operating habits, so that the electronic device may share the to-be-shared content to a device that meets user's expectations, thereby improving accuracy of dragging and sharing.

With reference to the first aspect, in an implementation, a size of the first hot zone remains unchanged, and a size of the second hot zone remains unchanged or increases as a drag speed of the second operation decreases.

In this way, there are a plurality of implementations for the electronic device to determine the target identifier based on the degree of overlap between the hot zones, thereby improving practicability of the method.

With reference to the first aspect, in an implementation, the electronic device fails to find the device corresponding to the second identifier after the first time period and before the electronic device stops the display of the first identifier.

With reference to the first aspect, in an implementation, the identifiers of the devices further include a third identifier, and the method further includes: displaying, by the electronic device, the third identifier at a third position in the second window after displaying the second identifier at the second position; and displaying, by the electronic device, the third identifier at the first position after stopping display of the first identifier.

In this way, during dragging and sharing, a position of the target identifier is not affected if an electronic device corresponding to the identifier before the target identifier fails to be found, so that the electronic device may accurately share the to-be-shared content to an electronic device corresponding to the target identifier.

With reference to the first aspect, in an implementation, a display position of the second identifier in the second window is unchanged, and the method specifically includes: displaying, by the electronic device, a third identifier before the second identifier, where the third identifier is an identifier of the device that is displayed after the second identifier in a first time period.

In this way, the electronic device may maintain the position of the target identifier unchanged, so that the electronic device may accurately share the to-be-shared content to an electronic device corresponding to the target identifier.

With reference to the first aspect, in an implementation, the controlling, by the electronic device within a second time period a moment when the electronic device stops the display of the first identifier to a moment when the electronic device detects the second operation, displacement of a display position of the second identifier in the second window to be less than a second value specifically includes: controlling, by the electronic device, a movement speed of the second identifier at the display position in the second window to be less than a fourth value after the electronic device stops the display of the first identifier; and controlling, by the electronic device when detecting the second operation, the displacement of the display position of the second identifier in the second window to be less than the second value.

In this way, the electronic device may control the displacement of the target identifier, so that the electronic device may accurately share the to-be-shared content to an electronic device corresponding to the target identifier.

With reference to the first aspect, in an implementation, the displaying the identifiers of the devices in the second window in a preset order specifically includes: sequentially displaying, by the electronic device, the identifiers of the plurality of devices in the second window in descending order of strength of signals for communication with the plurality of devices; or sequentially displaying, by the electronic device, the identifiers of the plurality of devices in the second window in descending order of frequency of communication with the plurality of devices; or sequentially displaying, by the electronic device, the identifiers of the plurality of devices in the second window in an order of initial letters of names of the plurality of devices in the alphabet.

With reference to the first aspect, in an implementation, in the process of receiving the first operation, the method further includes; finding, by the electronic device, a new device, where strength of a signal for communication between the new device and the electronic device is greater than a fifth value, or a frequency of communication between the new device and the electronic device is greater than a sixth value; or an order of an initial letter of a name of the new device in the alphabet precedes an initial letter of a name of a device corresponding to the second identifier; and displaying, by the electronic device, a fourth identifier of the new device at a fourth position in the second window.

During implementation of the method according to the first aspect, in a process in which a user performs a dragging and sharing operation, if the electronic device detects an identifier of a newly-added device, a display position of the target identifier still remains unchanged, so that the user may succeed in dragging an identifier of to-be-shared content to the target identifier for releasing, to send the to-be-shared content to a device corresponding to the target identifier, thereby improving user experience.

According to a second aspect, this application provides an electronic device, including one or more processors and one or more memories, where the one or more memories are coupled to the one or more processors, the one or more memories are configured to store computer program code, the computer program code includes computer instructions, and when the one or more processors execute the computer instructions, the electronic device is enabled to perform the method described in the implementation of the first aspect.

In this way, in a process in which a user performs a dragging and sharing operation, if the electronic device detects that an identifier before a target identifier disappears, a display position of the target identifier still remains unchanged, so that the user may succeed in dragging an identifier of to-be-shared content to the target identifier for releasing, to send the to-be-shared content to a device corresponding to the target identifier, thereby improving user experience.

According to a third aspect, this application provides a computer program product including instructions, and when the computer program product runs on an electronic device, the electronic device is enabled to perform the method described in the implementation of the first aspect.

In this way, when the computer program product runs on the electronic device, the electronic device may send the to-be-shared content to a device corresponding to the target identifier, thereby improving the user experience.

According to a fourth aspect, this application provides a computer-readable storage medium including instructions. When the instructions run on an electronic device, the electronic device is enabled to perform the method described in the implementation of the first aspect.

In this way, when the instructions run on the electronic device, the electronic device may send the to-be-shared content to a device corresponding to the target identifier, thereby improving the user experience.

DESCRIPTION OF EMBODIMENTS

Figure 1A:
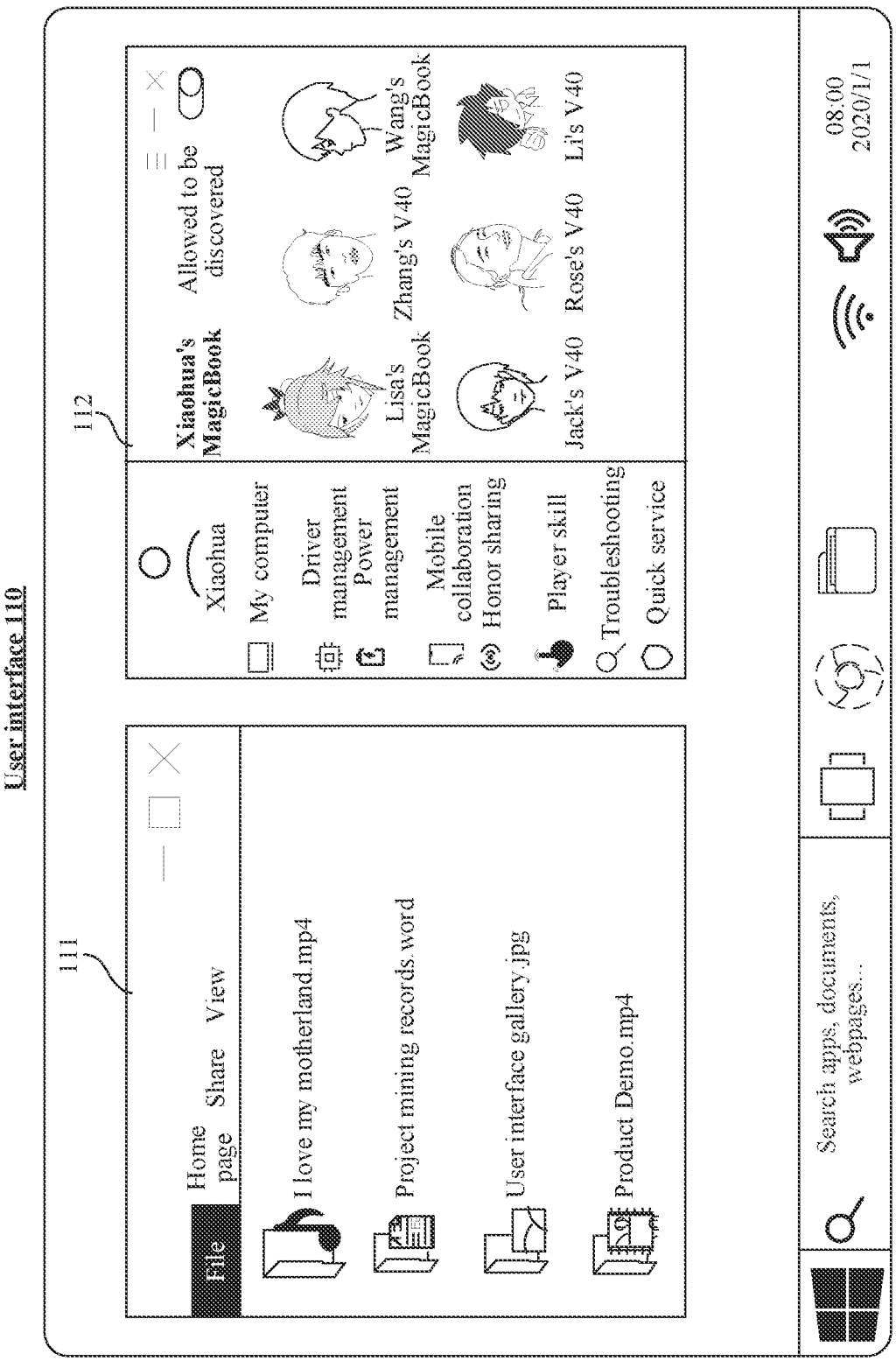
FIG. 1A to FIG. 1F are schematic diagrams of user interfaces of dragging and sharing according to an embodiment of this application.

The following clearly and thoroughly describes technical solutions in embodiments of this application with reference to the accompanying drawings. In the descriptions of the embodiments of this application, "/" means "or" unless otherwise specified. For example, A/B may represent A or B. "And/or" used herein describes only an association relationship for describing associated objects and represents that three relationships may exist. For example, A and/or B may represent the following three cases: Only A exists, both A and B exist, and only B exists.

The terms "first" and "second" mentioned below are merely intended for a purpose of description, and shall not be understood as an indication or implication of relative importance or implicit indication of the quantity of indicated technical features. Therefore, a feature defined to be "first" or "second" may explicitly or implicitly include one or more features. In the description of the embodiments of this application, unless otherwise specified, "a plurality of" refers to two or more.

"Embodiment" mentioned in this application means that particular features, structures, or characteristics described with reference to the embodiment may be included in at least one embodiment of this application. The term appearing at different positions of the specification may not refer to the same embodiment or an independent or alternative embodiment that is mutually exclusive with another embodiment. A person skilled in the art explicitly or implicitly understands that the embodiments described in this application may be combined with other embodiments.

The term "user interface (user interface, UI)" in the following embodiments of this application is a medium interface for interaction and information exchange between an application or operating system and a user, and implements the conversion between an internal form of information and a form of the information acceptable to the user. The user interface is source code written in a specific computer language such as java and the extensible markup language (extensible markup language, XML). The interface source code is parsed and rendered on an electronic device, and is finally presented as content that can be recognized by the user. A commonly-used representation form of the user interface is a graphic user interface (graphic user interface, GUI), which refers to a user interface that is displayed in a graphical manner and that is related to a computer operation. The representation form may be visual interface elements displayed in a display screen of the electronic device such as text, an icon, a button, a menu, a tab, a text box, a dialog box, a status bar, a navigation bar, or a Widget.

In some implementations, the user may perform a drag operation on the to-be-shared content with a finger or through an input device such as a mouse, a touch pen, a handle, or gloves, drag the to-be-shared content to a target identifier and release the same, and send the to-be-shared content to an electronic device corresponding to the target identifier. For details, reference may be made to an embodiment of the UI shown in FIG. 1A to FIG. 1D below.

Referring to FIG. 1A, FIG. 1A Exemplarily Shows a User Interface Provided by an Electronic Device for Dragging and Sharing.

As shown in FIG. 1A, a user interface 110 displays a content region 111 and a sharing region 112.

A series of content that can be shared by the user is displayed in the content region 111, including but not limited to: audio, text, a picture, a video, an application installation package, and the like.

The sharing region 112 displays an identifier corresponding to a nearby electronic device to which the user can share content, and the identifier includes but is not limited to: an image, a name, a model, and the like.

Figure 1B:
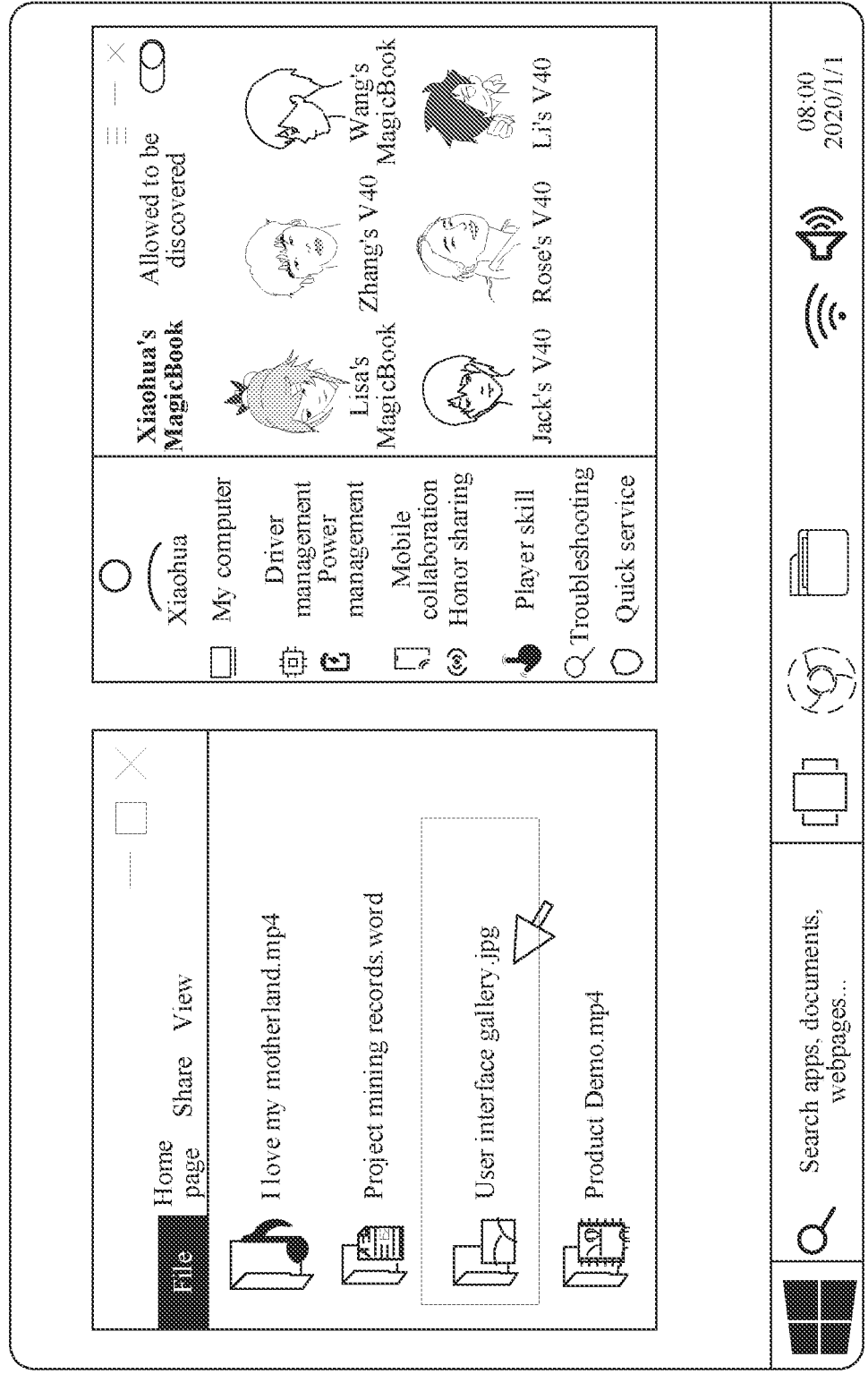
Figure 1C:
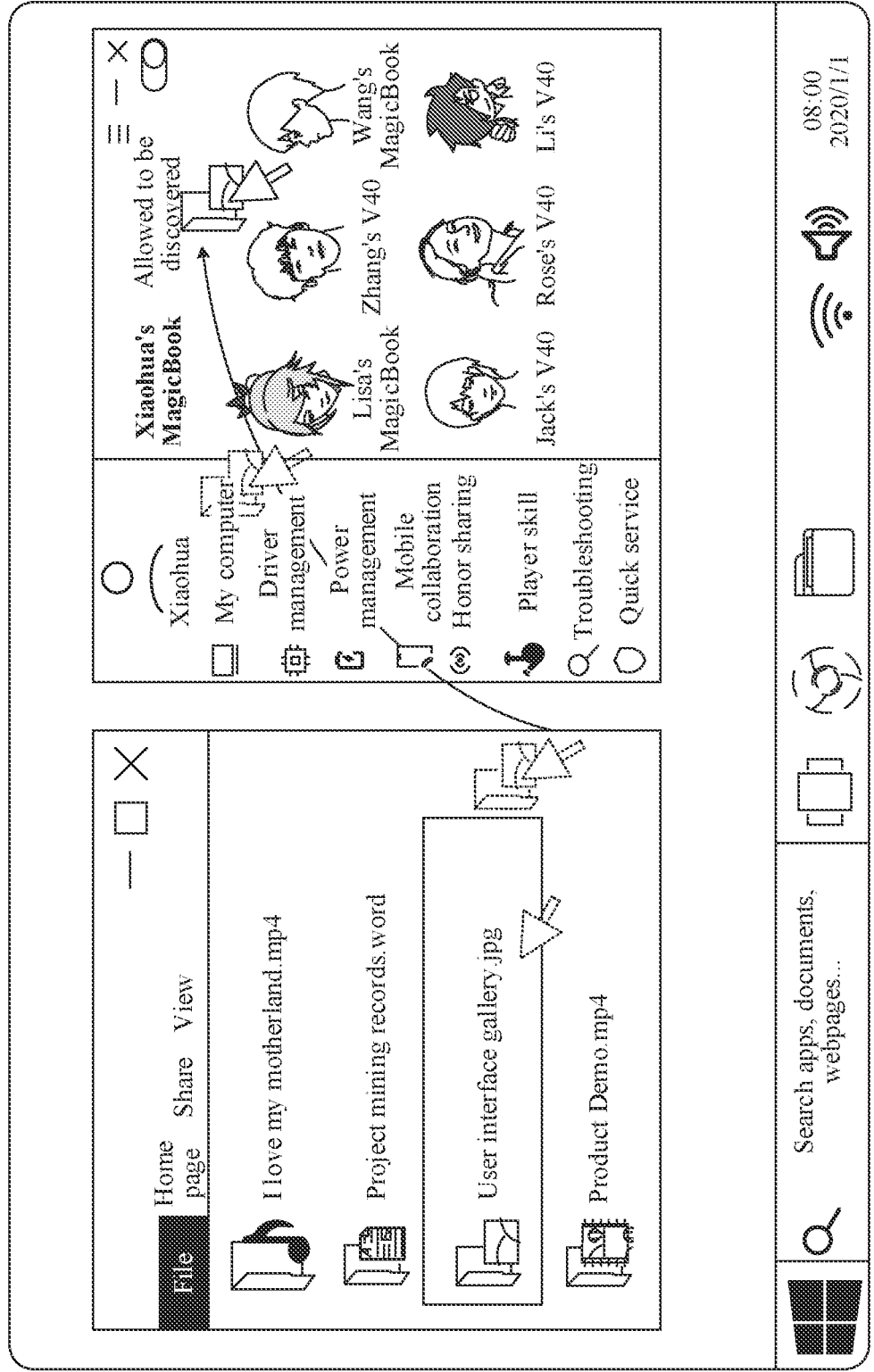

Referring to FIG. 1B and FIG. 1C, FIG. 1B and FIG. 1C Exemplarily Show that the Electronic Device Detects that the User Performs a Drag Operation on the to-be-Shared Content.

As shown in FIG. 1B, the user may select to-be-shared content in the content region 111 by using the mouse, for example, the user selects "user interface gallery".

As shown in FIG. 1C, the user may drag the selected to-be-shared content to the sharing region 112. Specifically, in this case, the user may drag the to-be-shared content to a target identifier, where the identifier may be, for example, "Zhang's V40".

Figure 1D:
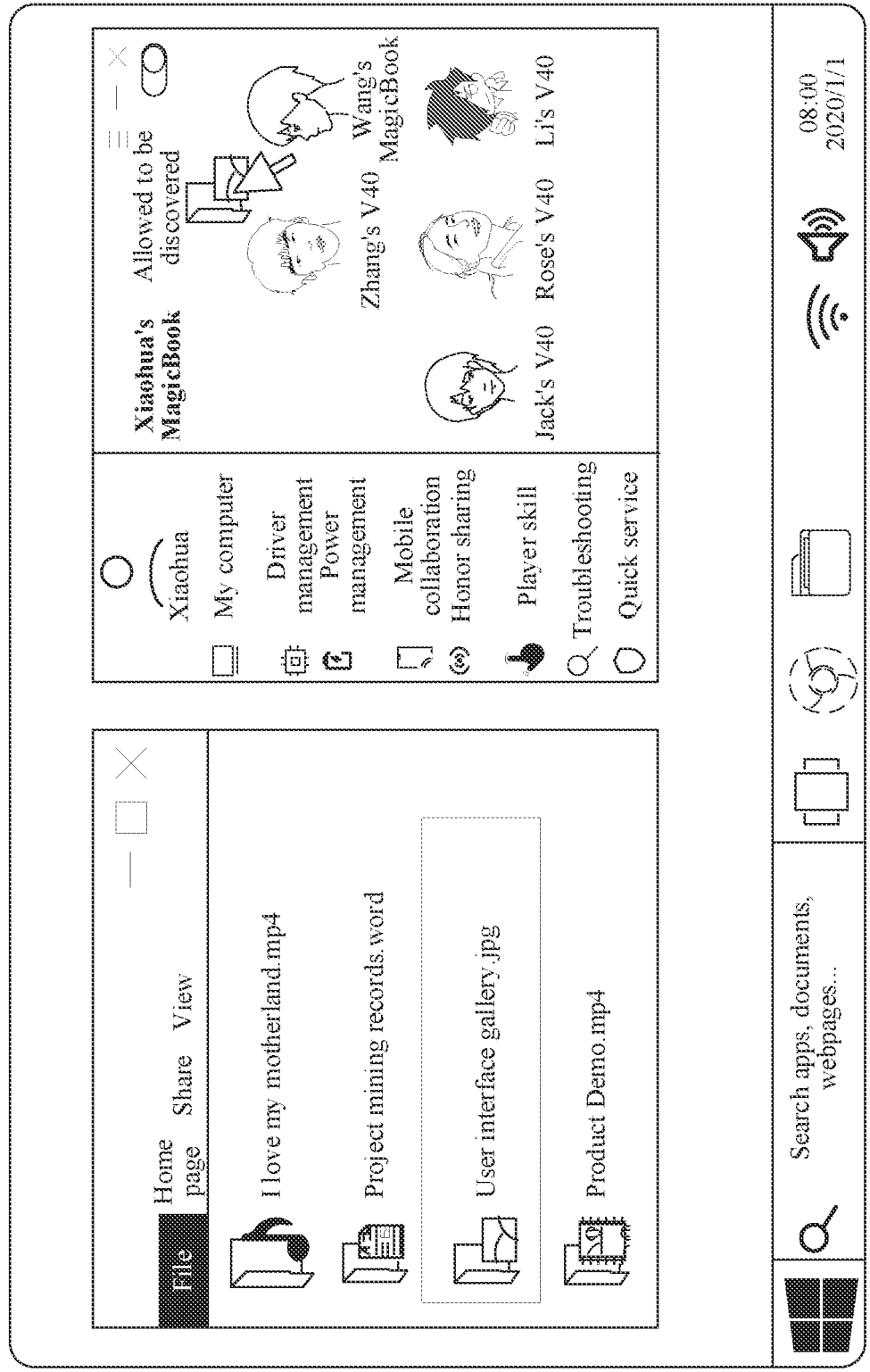

Referring to FIG. 1D, FIG. 1D Exemplarily Shows a User Interface in which an Identifier Before the Target Identifier Disappears.

As shown in FIG. 1D, when an electronic device corresponding to an identifier displayed in the sharing region 112 has any of the following situations: shutdown, network interruption, or disabling of functions found by other users, the identifier of the electronic device may disappear in the sharing region 112. For example, when an electronic device corresponding to "Lisa's MagicBook" has any of the foregoing situations, the identifier corresponding to the electronic device, including an image and a name such as "Lisa's MagicBook", may disappear in the sharing region 112.

Figure 1E:
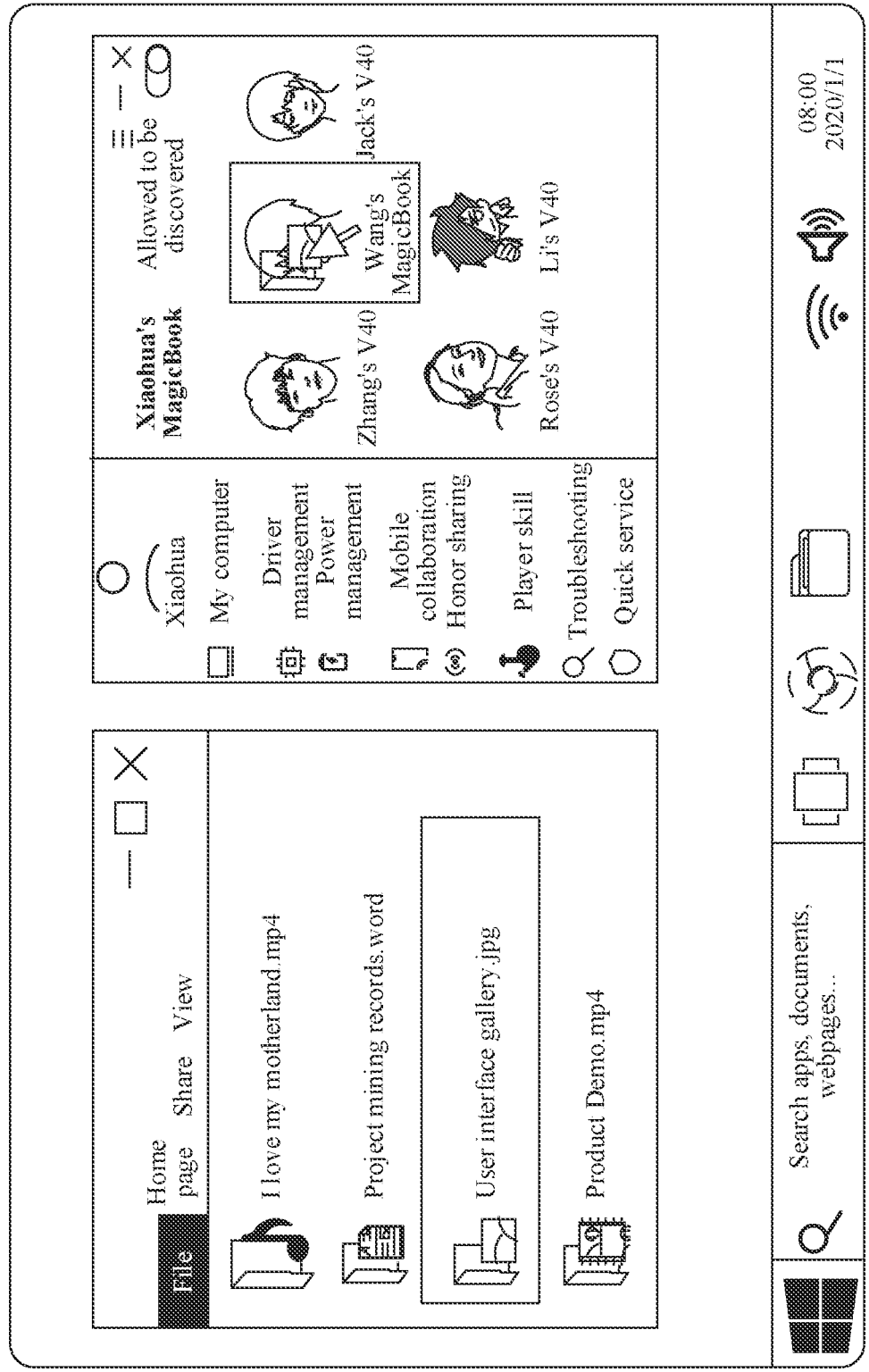

Referring to FIG. 1E, FIG. 1E Exemplarily Shows a User Interface in which Positions of Other Identifiers after the Disappearing Identifier Change.

As shown in FIG. 1E, when "Lisa's MagicBook" and a corresponding icon disappear, positions of identifiers of other electronic devices displayed after "Lisa's Magic-Book", including images and names, may automatically move forward, for example, positions of "Zhang's V40" and a corresponding icon after "Lisa's MagicBook" may move to a position of "Lisa's MagicBook" shown in FIG. 1C above, and "Wang's MagicBook" after "Zhang's V40" may move to a position of "Zhang's V40" shown in FIG. 1C above. By analogy, positions of identifiers of all electronic devices after "Wang's MagicBook" will move forward.

Figure 1F:
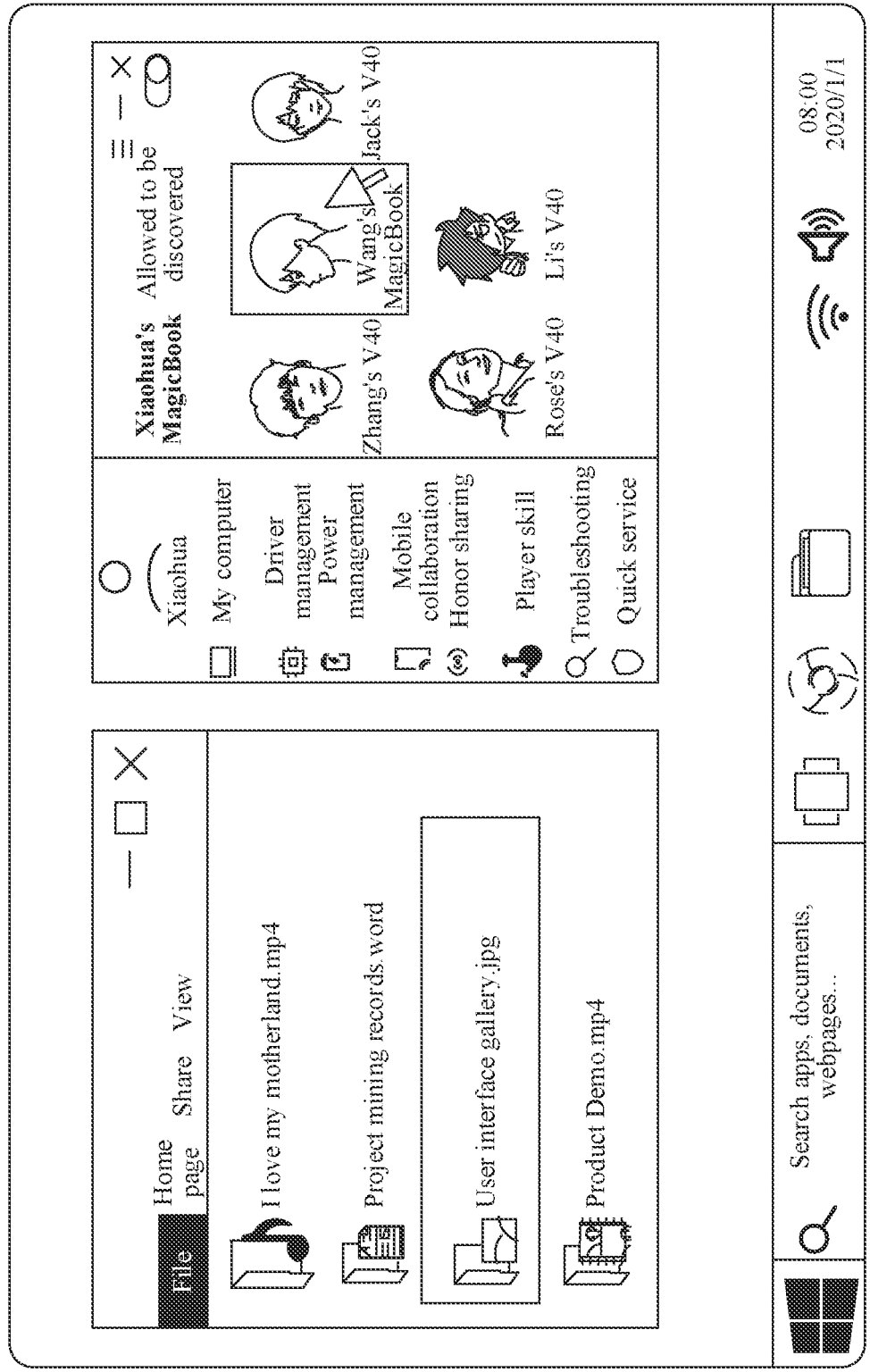

Referring to FIG. 1F, FIG. 1F Exemplarily Shows that the Electronic Device Detects that the to-be-Shared Content is Dragged to the Target Identifier and Released.

As shown in FIG. 1E, the electronic device detects an operation of dragging the to-be-shared content to an original position of the target identifier, that is, a position displayed by "Zhang's V40" shown in FIG. 1D for releasing. In this case, the region displays an identifier corresponding to "Wang's MagicBook" after "Zhang's V40", and consequently the electronic device sends the to-be-shared content to an electronic device corresponding to a non-target identifier, that is, to an electronic device corresponding to "Wang's MagicBook".

This is because a time it takes for the user to drag the to-be-shared content to the target identifier is very short. In this case, if the identifier before the target identifier disappears, the position of the target identifier such as "Zhang's V40" may also move forward, and the user is very likely to drag the to-be-shared content that has been dragged to the original target identifier to perform a releasing operation. Since the original target identifier displays the non-target identifier, that is, "Wang's MagicBook" after "Zhang's V40", this may cause the user to share the to-be-shared content to the electronic device corresponding to the non-target identifier, affecting user's sharing experience.

It may be understood that, it is not limited to the above-mentioned that when the identifier before the target identifier disappears, the display position of the target identifier suddenly changes. When there is an identifier newly added before the target identifier, the display position of the target identifier may also suddenly changes. For example, when the electronic device finds another newly-added nearby electronic device whose signal strength is greater than that of the electronic device corresponding to the target identifier or when the electronic device finds another newly-added and commonly-used nearby electronic device, an identifier of the foregoing new electronic device may be displayed before the target identifier, which causes the display position of the target identifier to move backward, and finally causes the user to share the to-be-shared content to the electronic device corresponding to the non-target identifier, affecting the user's sharing experience.

To resolve the foregoing problems, embodiments of this application provide a display method. In the method, the electronic device can find another nearby electronic device and display an identifier of the another electronic device. When determining that to-be-shared content is selected to perform a drag operation, the electronic device may determine a possible target identifier. When an identifier before the possible target identifier disappears, or the electronic device finds new-added another electronic device whose signal strength is greater than that of a device corresponding to the possible target identifier, or the electronic device finds a newly-added device that is commonly use, the electronic device can keep a position of the possible target identifier in the display screen unchanged. Then, the electronic device may detect that the user drags the to-be-shared content to the possible target identifier and releases the same, and finally the electronic device sends the to-be-shared content to the device corresponding to the target identifier.

The method for the electronic device to find another nearby electronic device specifically includes that: the electronic device broadcasts a detection request to a nearby electronic device through a Bluetooth (Bluetooth, BT) signal or a Wireless Local Area Network (Wireless Local Area Network, WLAN) signal, and if a response from the nearby electronic device is received, the electronic device considers that there are electronic devices capable of communicating nearby. The electronic devices capable of communicating are nearby electronic devices found by the electronic device.

The to-be-shared content refers to any one or more of the following provided by a system application installed in the electronic device, a third-party application, or a mobile storage device connected to the electronic device 100 such as a USB flash drive: text, a picture, a video, an application installation package, and the like.

The identifier refers to any one or more of an image, a name, and a model used to identify a nearby electronic device.

The possible target identifier refers to an identifier corresponding to an electronic device to which the user wants to share content, where the identifier is determined by the electronic device, which may be one or more of the nearby electronic devices found by the electronic device.

The target identifier refers to an identifier corresponding to an electronic device to which the user wants to share content, and the target identifier is included in the possible target identifier.

The situation where the identifier disappears specifically includes that: a distance between a nearby electronic device corresponding to the disappearing identifier and a local electronic device has exceeded coverage of a BT signal or WLAN signal of the local electronic device; or the nearby electronic device corresponding to the disappearing identifier suddenly turns off a wireless communication function, including a function such as Bluetooth communication or Wi-Fi communication; or the nearby electronic device corresponding to the disappearing identifier suddenly shuts down; or the nearby electronic device corresponding to the disappearing identifier suddenly loses power or the power is less than a threshold; or the nearby electronic device corresponding to the disappearing identifier suddenly disables a function found by another electronic device.

For the method for the electronic device to keep the position of the target identifier unchanged, reference may be made to the related descriptions of the method embodiment and an embodiment of the UI below. Details will not be repeated herein.

Therefore, after implementing the method provided in the embodiments of this application, the electronic device can share the to-be-shared content to an electronic device corresponding to the target identifier that meets user's expectations, thereby improving accuracy of sharing and improving user experience.

A dragging and sharing scenario provided in this embodiment of this application is applied to a communication system 10 including an electronic device 100 and an electronic device 200.

The electronic device 100 may be a notebook computer, a mobile phone, a tablet computer, a desktop computer, a laptop computer, a handheld computer, an ultra-mobile personal computer (ultra-mobile personal computer, UMPC), a netbook, an augmented reality (augmented reality, AR) device, a virtual reality (virtual reality, VR) device, an artificial intelligence (artificial intelligence, AI) device, a wearable device, a vehicle device, a smart home device and/or a smart city device, an exemplary embodiment of the electronic device 100 includes but does not Limited to electronic devices equipped with iOS, android, microsoft or other operating systems. A specific type of the electronic device 100 is not specially limited in this embodiment of this application.

The electronic device 200 is one or more other electronic devices near the electronic device 100, for example, a mobile phone, a tablet computer, a desktop computer, a laptop computer, a handheld computer, a notebook computer, an ultra-mobile personal computer (ultra-mobile personal computer, UMPC), an augmented reality (augmented reality. AR) device, a virtual reality (virtual reality, VR) device, an artificial intelligence (artificial intelligence, AI) device, a wearable device, a vehicle device, a smart home device and/or a smart city device, an exemplary embodiment of the electronic device 200 includes but does not Limited to electronic devices equipped with iOS, android, microsoft or other operating systems. A specific type of the electronic device 200 is not specially limited in this embodiment of this application.

In some embodiments of this application, the electronic device 100 may also be used in cooperation with another input device 300, for example, the input device 300 may be a mouse, a stylus, a handle, gloves, or the like. In this embodiment of this application, the input device 300 may be configured with various sensors, such as an acceleration sensor, a gyroscope sensor, a magnetic sensor, a pressure sensor, and the like. The input device 300 may establish a communication connection with the electronic device 100, and send, based on the communication connection, related information of the drag operation inputted by the user that is detected by the sensor to the electronic device 100. The electronic device 100 performs functions corresponding to the operations. The related information of the drag operation inputted by the user indicates the following: whether a control in the input device 300 is pressed or released after being pressed, and whether the input device is moved, and information such as a movement speed and a movement trajectory.

In some embodiments of this application, the electronic device 100 may display, in response to a detected user operation, a user interface including an identifier (such as one or more of an image, a name, and a model) of a nearby electronic device. Then, the electronic device 100 responds to a detected operation acting on an identifier of the electronic device 200, for example, an operation of dragging to-be-shared content to a position of the identifier of the electronic device 200 and releasing the same. In response to the operation, the electronic device 100 may establish a communication connection with the electronic device 200 corresponding to the identifier, and share the to-be-shared content through the communication connection. The communication connection is a wired connection or a wireless connection for communication through one or more of a BT communication module, a wireless local area network (wireless local area networks, WLAN) communication module, and a UWB communication module. The wired connection for communication through a USB interface, an HDMI interface, and other interfaces. The wireless connection may include a wireless connection for communication through one or more of a BT communication module, a WLAN communication module, and a UWB communication module.

To describe the display method provided in the embodiments of this application more clearly and in detail, an electronic device 100 involved in implementing the method provided in the embodiments of this application is firstly described below.

Figure 2:
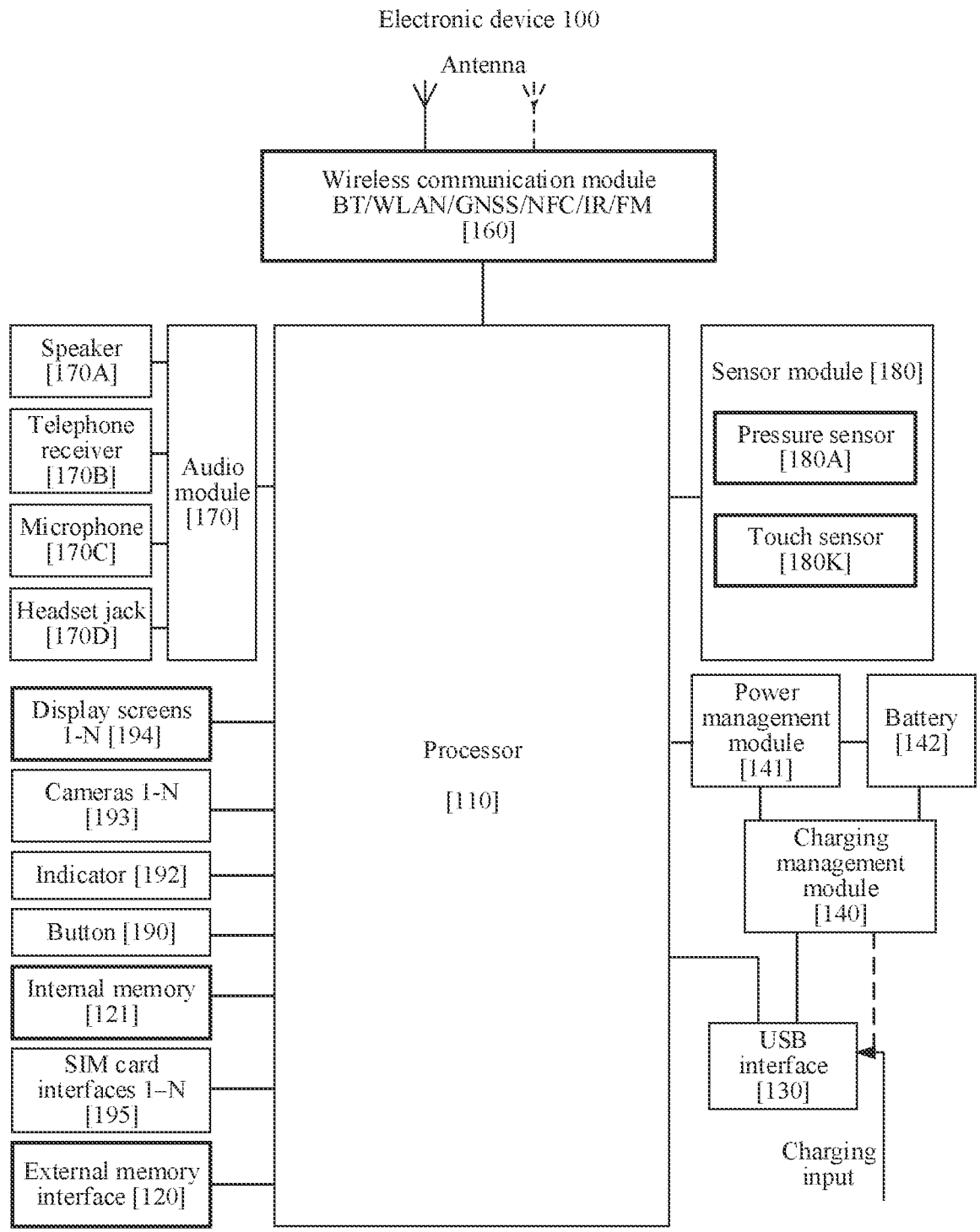
FIG. 2 is a diagram of a hardware structure of an electronic device according to an embodiment of this application.

FIG. 2 is a schematic diagram of a hardware structure of an electronic device 100.

The electronic device 100 may include a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, and an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that an example structure in this embodiment of the present invention does not constitute a specific limitation on the electronic device 100. In some other embodiments of this application, the electronic device 100 may include more or fewer components than those shown in the figure, or some components may be combined, or some components may be divided, or different component arrangements may be used. The components in the portrait may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may generate an operation control signal based on an instruction operation code and a time sequence signal, to complete control of instruction reading and instruction execution.

A memory may be further configured in the processor 110, to store an instruction and data. In some embodiments, the memory in the processor 110 is a cache memory. The memory may store an instruction or data that is just used or circularly used by the processor 110. If the processor 110 needs to use the instruction or the data again, the processor may directly invoke the instruction or the data from the memory, to avoid repeated access and reduce a waiting time of the processor 110, thereby improving system efficiency.

In this embodiment of this application, the processor 110 may receive related information of the user's drag operation on the to-be-shared content through the sensor module 180, and determine the movement speed and the movement trajectory of the to-be-shared content according to the related information. When the to-be-shared content is dragged to the sharing region, the processor can also determine a possible target identifier according to the movement speed and the movement trajectory, and then call a display module to control a display position of the identifier to remain unchanged. Finally, the processor 110 may also receive a user's release operation at a position of the target identifier through the sensor, and then call a communication module to share the to-be-shared content to an electronic device corresponding to the target identifier.

For the method for controlling the display position of the possible target identifier to remain unchanged, reference may be made to specific descriptions of the method embodiment and an embodiment of the UI below. Details will not be repeated herein.

In some embodiments, the processor 110 may include one or more interfaces. The interface may include an integrated circuit (inter-integrated circuit, I2C) interface, an integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) an external memory interface 120, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be coupled to the touch sensor 180K, a charger, a flash light, the camera 193, and the like by using different I2C bus interfaces. For example, the processor 110 may be coupled to the touch sensor 180K by using the I2C interface, so that the processor 110 communicates with the touch sensor 180K by using the I2C bus interface, to implement a touch function of the electronic device 100.

The I2S interface may be used for audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transfer an audio signal to the wireless communication module 160 through the I2S interface, to implement a function of answering a call through a Bluetooth headset.

The PCM interface may also be used for audio communication, and sampling, quantization, and encoding of an analog signal. In some embodiments, the audio module 170 may be coupled to the wireless communication module 160 by using the PCM bus interface. In some embodiments, the audio module 170 may alternatively transfer an audio signal to the wireless communication module 160 by using the PCM interface, to implement the function of answering a call by using a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is generally used to connect the processor 110 with the wireless communication module 160. For example, the processor 110 communicates with a Bluetooth module in the wireless communication module 160 by using a UART interface, to implement a Bluetooth function. In some embodiments, the audio module 170 may transfer an audio signal to the wireless communication module 160 by using a UART interface, to implement the function of playing music by using a Bluetooth headset.

The MIPI interface may be configured to connect the processor 110 to a peripheral device such as the display screen 194 and the camera 193. The MIPI interface includes a camera serial interface (camera serial interface, CSI), a display serial interface (display serial interface, DSI), and the like. In some embodiments, the processor 110 communicates with the camera 193 by using the CSI interface, to implement a photographing function of the electronic device 100. The processor 110 communicates with the display screen 194 by using a DSI interface, to implement a display function of the electronic device 100.

The GPIO interface may be configured by using software. The GPIO interface may be configured to transmit a control signal, or may be configured to transmit a data signal. In some embodiments, the GPIO interface may be configured to connect the processor 110 to the camera 193, the display screen 194, the wireless communication module 160, the audio module 170, the sensor module 180, and the like. The GPIO interface may also be configured as an I2C interface, an I2S interface, a UART interface, an MIPI interface, and the like.

The external memory interface 120 may be configured to connect to an external non-volatile memory, to expand a storage capability of the electronic device 100. The external non-volatile memory communicates with the processor 110 by using the external memory interface 120, to implement a data storage function, for example storing a file such as a music or a video in the external non-volatile memory. The electronic device 100 may further include an internal memory 121. The internal memory 121 may include one or more random access memories (random access memories, RAMs) and one or more non-volatile memories (non-volatile memories, NVMs). The random access memories may include a static-random access memory (static-random access memory, SRAM), a dynamic random access memory (dynamic random access memory, DRAM), a synchronous dynamic random access memory (synchronous dynamic random access memory. SDRAM), double data rate synchronous dynamic random access memory (double data rate synchronous dynamic random access memory, DDR SDRAM, for example, a fifth generation DDR SDRAM is generally referred to as DDR5 SDRAM), and the like. The random access memory may be directly read and written by the processor 110, may be configured to store executable programs (for example, machine instructions) of an operating system or other running programs, or may be configured to store data of users and applications. The non-volatile memories may include a magnetic disk storage device and a flash memory. The flash memory may be divided into NOR FLASH, NAND FLASH, 3D NAND FLASH, and the like according to an operation principle, or may be divided into a single-level cell (single-level cell, SLC), a multi-level cell (multi-level cell, MLC), a triple-level cell (triple-level cell, TLC), a quad-level cell (quad-level cell, QLC), and the like according to an electrical potential level of a storage unit, or may be divided into a universal flash storage (universal flash storage, UFS), an embedded multimedia card, (embedded multimedia card, eMMC), and the like according to a storage specification. The non-volatile memory may also store the executable programs, the data of the users and the applications, and the like, and may be loaded into the random access memory in advance for the processor 110 to perform direct reading and writing.

In this embodiment of this application, in the external non-volatile memory connected to the external memory interface 120 and/or the internal memory 121, to-be-shared content can be stored, and the to-be-shared content may be: an audio, a video, a picture, text, an application installation package, and other files. This is not limited in this embodiment of this application.

The USB interface 130 is an interface that conforms to a USB standard specification, and may be specifically a mini USB interface, a micro USB interface, a USB Type C interface, or the like. The USB interface 130 may be configured to connect to the charger to charge the electronic device 100, or may be used for data transmission between the electronic device 100 and a peripheral device, or may be configured to connect to a headset, to play audio by using the headset. The interface may alternatively be configured to connect to another electronic device such as an AR device.

In some embodiments of this application, the electronic device 100 may establish a communication connection with the input device 300 through the MIPI interface, the GPIO interface, or the USB interface, receive, based on the communication connection, related information of an operation inputted by the user from the input device 300, and determine a movement speed and a movement trajectory of the input device 300 according to the related information. The related information of the operation inputted by the user includes: whether a control in the input device 300 is pressed or released after being pressed, and whether the input device is moved, and information such as a movement speed and a movement trajectory.

It may be understood that an interface connection relationship between the modules illustrated in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive charging input from a charger. The charger may be a wireless charger or a wired charger. In some embodiments of wired charging, the charging management module 140 may receive a charging input of a wired charger by using the USB interface 130. In some embodiments of wireless charging, the charging management module 140 may receive a wireless charging input by using a wireless charging coil of the electronic device 100. The charging management module 140 may supply power to the electronic device by using the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, the display screen 194, the camera 193, the wireless communication module 160, and the like. The power management module 141 may be further configured to monitor parameters such as a battery capacity, a battery cycle count, and a battery state of health (electric leakage and impedance). In some other embodiments, the power management module 141 may be alternatively disposed in the processor 110. In some other embodiments, the power management module 141 and the charging management module 140 may further be configured in the same device.

A wireless communication function of the electronic device 100 may be implemented by using the antennae, the mobile communication module 150, the wireless communication module 160, the modem processor, the baseband processor, and the like.

The antenna is configured to transmit and receive electromagnetic wave signals. Each antenna of the electronic device 100 may be configured to cover one or more communication frequency bands. Different antennas may be multiplexed to improve antenna utilization. For example, the antenna 1 may be multiplexed into a diversity antenna of a wireless local area network. In some other embodiments, the antennas may be used with a tuning switch.

The mobile communication module 150 may provide a solution to wireless communication such as 2G/3G/4G/5G applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be configured in the processor 110. In some embodiments, at least some functional modules of the mobile communication module 150 and at least some modules of the processor 110 may be configured in the same device.

The modem processor may include a modulator and a demodulator. The modulator is configured to modulate a to-be-sent low-frequency baseband signal into a medium-high-frequency signal. The demodulator is configured to demodulate the received electromagnetic wave signal into a low frequency baseband signal. Then the demodulator transfers the low-frequency baseband signal obtained through demodulation to the baseband processor for processing. The low-frequency baseband signal is processed by the baseband processor and is then transferred to the application processor. The application processor outputs a sound signal through an audio device (which is not limited to the speaker 170A, the telephone receiver 170B, and the like), or displays an image or a video through the display screen 194. In some embodiments, the modem processor may be an independent device. In some other embodiments, the modem processor may be independent of the processor 110, and the modem processor and the mobile communication module 150 or another functional module may be disposed in the same component.

The wireless communication module 160 may provide a solution for wireless communication including a wireless local area network (wireless local area network, WLAN) (such as a wireless fidelity (wireless fidelity, Wi-Fi) network), Bluetooth (Bluetooth, BT), and a global navigation satellite system (global navigation satellite system. GNSS), frequency modulation (frequency modulation, FM), a near field communication (near field communication, NFC) technology, an infrared (infrared. IR) technology, and the like to be applied to the electronic device 100. The wireless communication module 160 may be one or more devices integrating at least one communication processing module. The wireless communication module 160 receives an electromagnetic wave by using the antenna 2, performs frequency modulation and filtering processing on an electromagnetic wave signal, and sends a processed signal to the processor 110. The wireless communication module 160 may alternatively receive a to-be-sent signal from the processor 110, perform frequency modulation and amplification on the to-be-sent signal, and convert the signal into an electromagnetic wave for radiation by using the antenna 2.

In some embodiments, the antenna 1 and the mobile communication module 150 of the electronic device 100 are coupled, and the antenna 2 and the wireless communication module 160 are coupled, so that the electronic device 100 can communicate with a network and another device by using a wireless communication technology. The wireless communications technology may specifically include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system. GLONASS), a beidou navigation satellite system (beidou navigation satellite system, BDS), a quasi-zenith satellite system (quasi-zenith satellite system, QZSS), and/or a satellite based augmentation system (satellite based augmentation systems, SBAS).

In some embodiments of this application, the electronic device 100 can find a nearby electronic device through the mobile communication module 150 or the wireless communication module 160, and establish a communication connection with the nearby electronic device to share content. In some other embodiments of this application, the electronic device 100 may not have the mobile communication module 150, and therefore the communication module used when the electronic device 100 communicates with another electronic device is determined by the implementation of the electronic device 100.

The electronic device 100 implements a display function by using the GPU, the display screen 194, the application processor, and the like. The GPU is a microprocessor for image processing, and is connected to the display screen 194 and the AP. The GPU is configured to perform mathematical and geometric calculation, and is configured to render an image. The processor 110 may include one or more GPUs, and execute program instructions to generate or change display information.

The display screen 194 is configured to display an image, a video, and the like. The display screen 194 includes a display panel. The display panel may use a liquid crystal touchscreen (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), and the like. In some embodiments, the electronic device 100 may include one or N display screens 194, N being a positive integer greater than 1.

In this embodiment of this application, the display screen 194 may be configured to display an identifier of an electronic device corresponding to to-be-shared content and an attachment, and maintain the display position of the possible target identifier unchanged. For the method for displaying the possible target identifier on the display screen 194, reference may be made to the related descriptions of the method embodiment and an embodiment of the UI below. Details will not be repeated herein.

In some embodiments of this application, the display screen 194 may also be a touch screen. To be specific, the display screen 194 of the electronic device 100 is equipped with any one or more of the pressure sensor 180A and the touch sensor 180K described below. In this case, the screen 194 can be touched through components such as a stylus or a finger to control the electronic device 100 to perform a corresponding operation.

The pressure sensor 180A is configured to sense a pressure signal, and may convert the pressure signal into an electrical signal. In some embodiments, the pressure sensor 180A may be disposed in the touchscreen 194. There are a plurality of types of pressure sensors 180A, for example, a resistive pressure sensor, an inductive pressure sensor, and a capacitive pressure sensor. The capacitive pressure sensor may include at least two parallel plates made of a conductive material. When a force is applied to the pressure sensor 180A, capacitance between electrodes changes. The electronic device 100 determines pressure strength based on a change in the capacitance. When a touch operation is performed on the display screen 194, the electronic device 100 detects intensity of the touch operation according to the pressure sensor 180A. The electronic device 100 may also calculate a touch position based on a detection signal of the pressure sensor 180A. In some embodiments, the touch operations that are performed at a same touch position but have different touch operation strength may correspond to different operation instructions. For example, when a touch operation whose touch operation strength is less than a first pressure threshold is performed on an SMS message application icon, an instruction of checking an SMS message is executed. When a touch operation whose touch operation intensity is greater than or equal to the first pressure threshold is performed on the icon of the SMS message application, an instruction for creating a new SMS message is performed.

The touch sensor 180K is also referred to as a "touch device". The touch sensor 180K can be disposed in the display 194, and the touch sensor 180K and the display 194 constitutes a touch screen, also referred to as a "touch-screen". The touch sensor 180K is configured to detect a touch operation performed on or near the touch sensor 180K. The touch sensor may transfer the detected touch operation to the application processor to determine a type of the touch event. The touch sensor 180K may provide a visual output related to the touch operation by using the display screen 194. In some other embodiments, the touch sensor 180K may alternatively be disposed on a surface of the electronic device 100, and is located on a position different from that of the display screen 194.

In some other embodiments of this application, the sensors such as the pressure sensor 180A and the touch sensor 180K, may be configured in the display screen 194 of the electronic device 100, or may also be configured in a touchpad region of the keyboard of the electronic device 100 for receiving an operation inputted by the user. Specifically, the pressure sensor 180A can detect a user's operation of clicking a touch panel with a finger or a stylus, and then the pressure sensor 180A may generate corresponding pressure information according to the operation inputted by the user, and send the pressure information to the processor 101. The processor 101 may obtain coordinate information that the user acts on the display screen according to the pressure information, and finally perform a corresponding operation according to the coordinate information.

A software system of the electronic device 100 may use a layered architecture, an event-driven architecture, a micro core architecture, a micro service architecture, or a cloud architecture. In the layered architecture, software is divided into several layers, and each layer has a clear role and task. Layers communicate with each other through a software interface. In some embodiments, Generally, the software system of the electronic device 100 may include an application layer, a kernel layer, and the like.

The application layer may include a series of application packages. The kernel layer is a layer between hardware and software. The kernel layer includes at least a display drive and a sensor drive.

In some embodiments of this application, the kernel layer of the electronic device 100 may also include a mouse driver and the like. The mouse driver is installed in the system in a form of a device driver, and the mouse driver is responsible for completing the following three tasks: The first is to display a mouse cursor on a screen and maintain movement of the cursor. The second is to provide the application with a state of the mouse, which includes a position of the mouse cursor on the screen and whether each button of the mouse is pressed or released. The third is to provide some auxiliary functions for the mouse operation for the application, for example, controlling switching of a page provided by a reference program through a scroll control, or change of a page progress bar.

For the description of software and hardware architecture of the electronic device 200, reference may be made to the description of the electronic device 100, and details are not repeated herein.

The input device 300 generally includes: a micro controller unit (Micro controller unit, MCU), a sensor unit, and the like.

A method for using the mouse in cooperation with the electronic device 100 is described by using an example the implementation of the input device 300 is a mouse. The mouse may include: a control chip, an optical sensor, an optical lens, a light-emitting diode, buttons, a scroll wheel, a connection line, a USB interface, a housing, and the like. The control chip is responsible for coordinating tasks of various components in the mouse, communicating with external circuits and transmitting and receiving various signals. The working principle of using the mouse to realize cursor positioning of the electronic device 100 is as follows: First, a light-emitting diode is mounted inside the mouse, and light emitted by the light-emitting diode may illuminate a rough surface on the bottom of a photoelectric mouse. Then, a group of optical lenses is mounted inside the mouse, and the optical lenses can transmit a part of the light reflected from a bottom surface of the photoelectric mouse to an optical sensing device such as an imaging sensor for imaging. In this way, when the mouse moves, a movement trajectory may be recorded as a set of coherent images captured at a high speed. Finally, a dedicated image analysis chip inside the mouse, namely, a digital signal processor DSP is used to analyze and process each image captured for the movement trajectory, and determine a movement direction and a movement distance of the mouse by comparing and analyzing positions of feature points on these images, to obtain coordinate values of the mouse on the screen, and then transmit the coordinate values to the MCU of the mouse through a serial peripheral interface (Serial peripheral interface, SPI). After processing these numerical values, the MCU of the mouse transmits the values to a host computer, that is, the electronic device 100, and the cursor is positioned.

A method for using a stylus in cooperation with the electronic device 100 is described by using an example the implementation of the input device 300 is a stylus. The stylus may include: an MCU, a drive unit, a pressure sensor, and a stylus tip. The MCU may be configured to receive and analyze pressure data reported by the pressure sensor, detect states of functional keys, and the like. The pressure sensor may be configured to detect pressure data of the tip of the stylus, and report the detected pressure data of the tip of the stylus to the MCU. The driving unit may be configured to provide a voltage driving signal to the tip of the stylus. After receiving a voltage driving signal, the tip of the stylus may output a signal that enables the electronic device 100 to detect, such as an electrical signal. When the tip is close to the electronic device 100, the electronic device 100 may detect an electrical signal outputted by the stylus tip. After the electronic device 100 detects an input signal of the stylus, the electronic device 100 may determine a specific position of the tip of the stylus on the touch sensor of the electronic device 100 such as the display screen 194 through the touch chip.

When the implementation of the input device 300 is another device other than the mouse and the stylus, for example, a handle, gloves, and the like. The principle of using the input device 300 in cooperation with the electronic device 100 is the similar to that of the mouse or stylus and the electronic device 100. Details will not be repeated herein.

The display method provided in the embodiments of this application may be further described in detail with reference to the embodiment of the UI. For details, reference may be made to the descriptions of FIG. 3A-FIG. 3G. FIG. 4A-FIG. 4H, and FIG. 5A-FIG. 5B below.

Figure 3A:
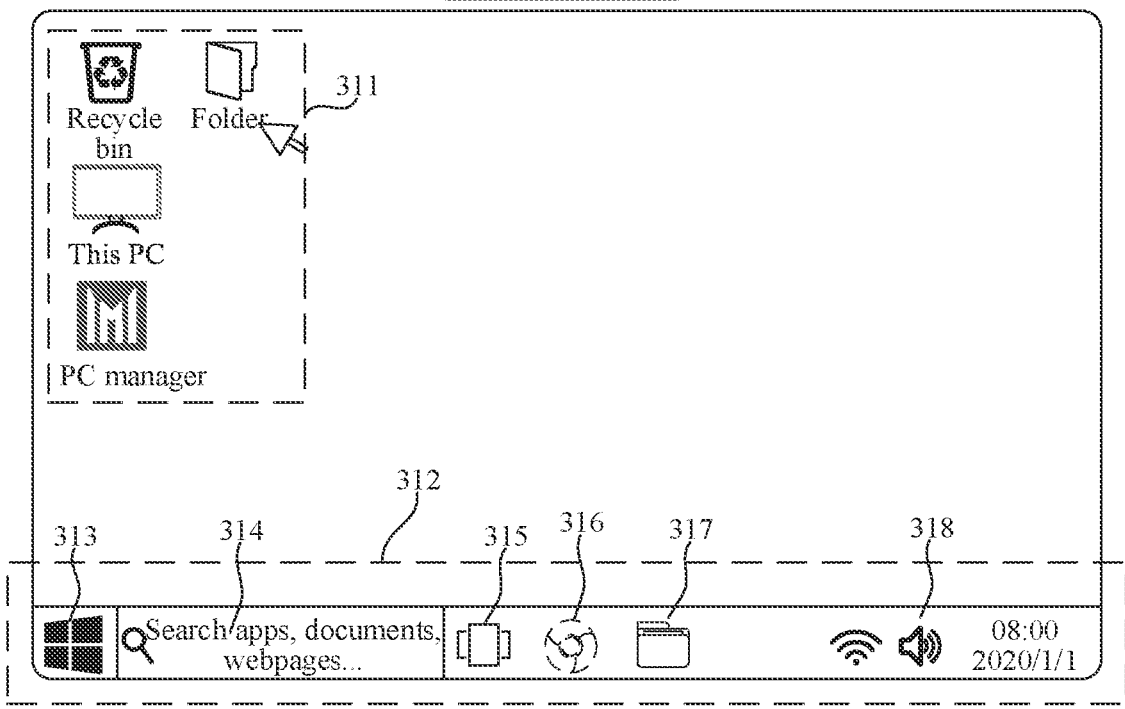
FIG. 3A to FIG. 3G are schematic diagrams of another group of user interfaces according to an embodiment of this application.

Referring to FIG. 3A, FIG. 3A Schematically Shows a Desktop Displayed by the Electronic Device 100.

As shown in FIG. 3A, an application menu 311 and a task bar 312 are displayed on the user interface 310.

Icons of system applications or third-party applications installed on the electronic device 100 are displayed in the application menu 311, and the electronic device 100 can provide the user with a shortcut service of opening the corresponding application by detecting an operation performed on the icon of the application.

The task bar 312 is a small long column located at the bottom of the desktop of the electronic device 100, mainly including: a start menu 313, a search bar 314, a task view control 315, a fixed task bar 316, an application area 317, and a tray area 318. The start menu 313 can provide the user with most of the installed applications, as well as services such as power-on, power-off, and restart. The search bar 314 provides users with quick search services. The task view control 315 can provide a service for the user to browse recently executed tasks. The shortcuts of the most commonly used applications can be displayed in the fixed task bar 316. The application area 317 can display icons of applications that are executing tasks in the electronic device 100. The tray area 318 vividly displays important information of software and hardware of the computer, such as time information and a network state through various small icons.

In some embodiments of this application, the electronic device 100 may also display a cursor, and a display form of the cursor can be an icon, an image, and the like. When the cursor is on a different page displayed on the display screen 194 of the electronic device 100, or at a different position on the same page, the icon and image corresponding to the cursor may be different. For example, when the cursor is on the desktop, the icon corresponding to the cursor may be an arrow or a hand icon, and when the cursor is on the search bar 314, the icon corresponding to the cursor may be is a vertical line.

In this embodiment of this application, the position of the cursor on the display screen 194 may be moved according to the movement of an input device used in conjunction with the electronic device, such as a mouse, a handle, gloves, and the like.

It may be understood that FIG. 3A is merely for an exemplary description of the desktop displayed by the electronic device 100, and the desktop displayed by the electronic device 100 may also display more or less content than that shown in FIG. 3A. This is not limited in this embodiment of this application.

Referring to FIG. 3B-FIG. 3G, FIG. 3D-FIG. 3G Exemplarily Show a Series of User Interfaces in which the Electronic Device 100 Displays a Content Region and/or a Sharing Region.

Figure 3B:
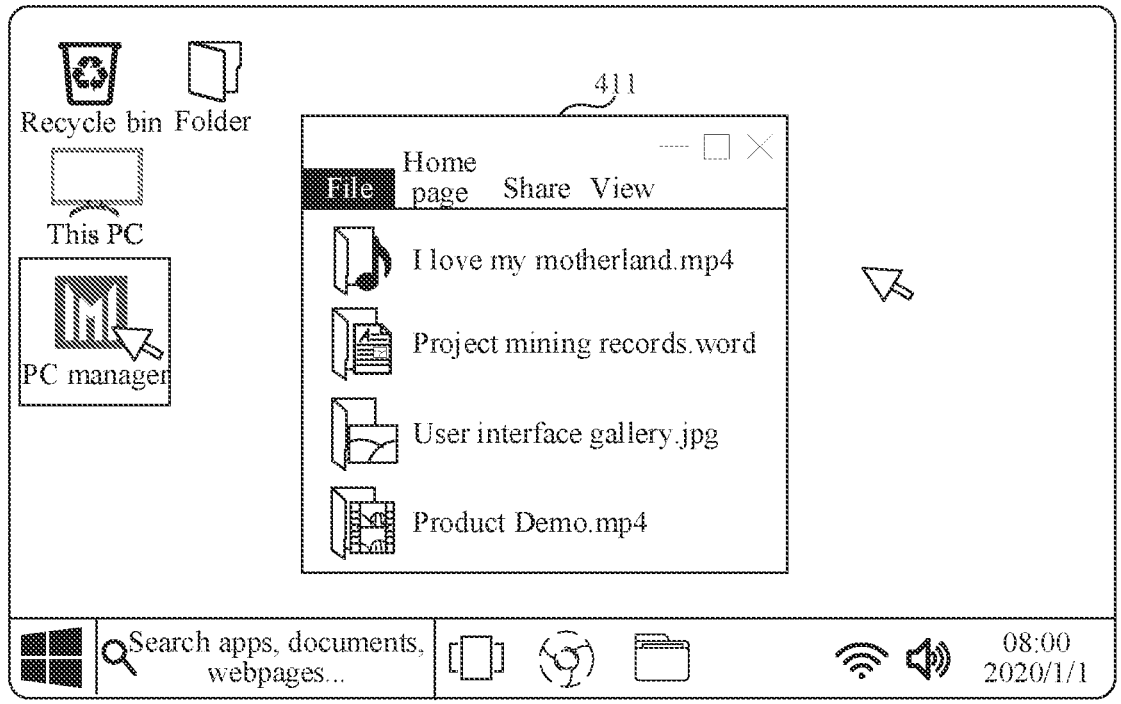
Figure 3C:
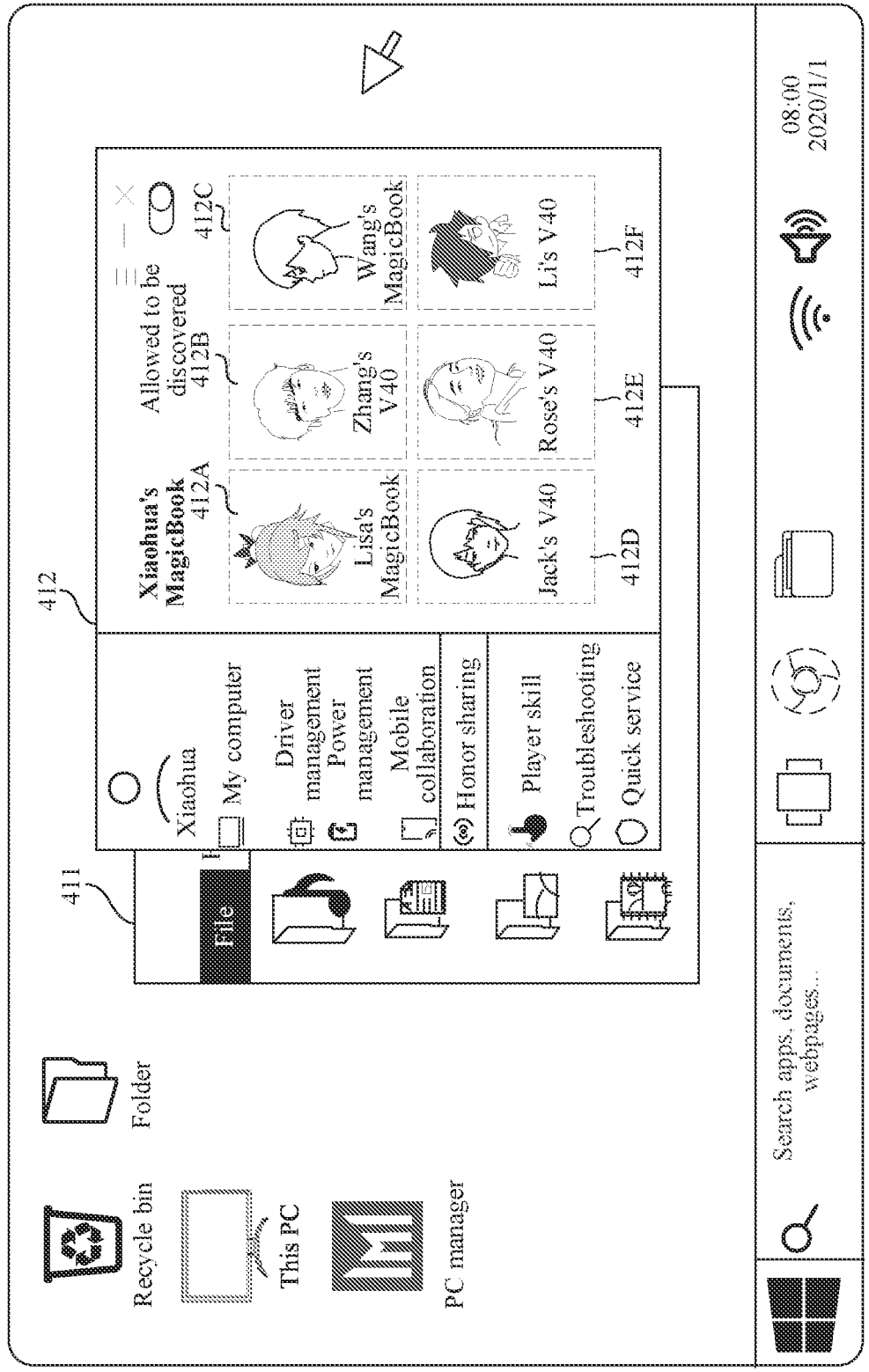
Figure 3D:
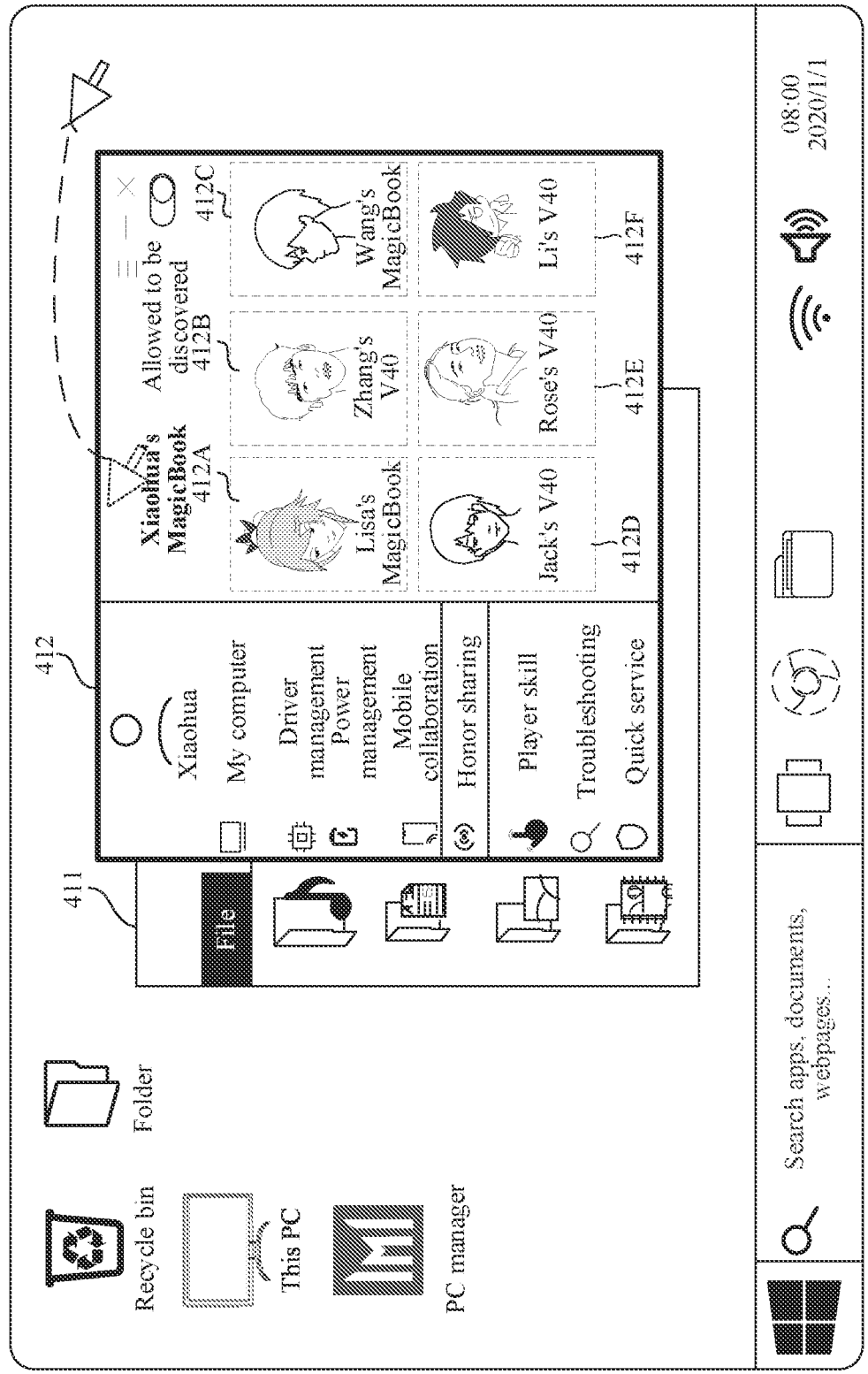

Referring to FIG. 3D, FIG. 3B Exemplarily Shows a User Interface in which the Electronic Device 100 Displays a Content Region.

As shown in FIG. 3B, a content region 411 on displayed in the user interface 410. For other content displayed on the user interface 410, reference may be made to the description of the user interface 310 shown in FIG. 3A above, and details will not be repeated herein.

The content region 411 may be a content region 411 displayed by the electronic device 100 after the electronic device 100 detects an operation performed on an icon of a folder shown in FIG. 3B or on an icon of an application of the computer.

Any one or more of the following may be displayed in the content region 411; an audio, text, a video, a picture, an application layer program installation package, and the like. The content region 411 may be used for the user to browse or edit various displayed content, and the editing operation include deleting, copying, renaming, movement positions, creating shortcuts, sharing to other devices and the like. Each piece of content displayed in the content region 411 may be displayed in a form of a list item or in a form of an icon. This is not limited in this embodiment of this application.

In some embodiments, the display position of the content region 411 in the display screen 194 may be displayed in full screen or not in full screen. The position of the content region 411 in the display screen 194 may be adjusted to any size and any position according to an operation performed by the user.

It may be understood that a provider of the content region 411 may also be provided by other system applications or third-party applications installed in the electronic device 100, or provided by an external mobile storage device such as a USB flash drive. This is not limited in this embodiment of this application.

When the Electronic Device 100 Detects an Operation Performed on a Computer Manager Application Icon Shown in FIG. 3D, the Electronic Device May Display a User Interface Shown in FIG. 3C.

Referring to FIG. 3C, FIG. 3C Exemplarily Shows a User Interface in which the Electronic Device 100 Displays a Sharing Region.

As shown in FIG. 3C, a sharing region 412 is displayed in a user interface 410. The sharing region 412 is provided by the computer manager installed in the electronic device 100. An identifier of the electronic device 200 is displayed in the sharing region 412, such as 412A, 412B, 412C, 412D, 412E, 412F, and the like. The electronic device 200 is the nearby electronic device found by the electronic device 100 within the first time period. For a display rule of various identifiers of the electronic device 200, reference may be made to the description of step S102 in the method embodiments below, and details will not be repeated herein.

In this embodiment of this application, the identifier of the electronic device 200 may include any one or more of the following: an image, a name, a model, and the like. For example, the identifier displayed by 412A includes an image, a name of "Lisa", and a model of "MagicBook". The name may be a name of an account logged in to the electronic device 200, the image may be an avatar corresponding to the account, and the model is a model of the electronic device 200. When no account is logged in to the electronic device 200, the identifier of the electronic device displayed by the electronic device 100 may only include a model, or may also include a default avatar, for example, the default avatar may be an icon of the electronic device 200. It is to be noted that the electronic device 200 may be a device provided by a manufacturer of Honor, or may be a device provided by another manufacturer. The model of the electronic device 200 is not limited in the embodiments of this application. When the nearby electronic device does not log in to the account.

It may be understood that, when detecting the operation performed on the computer manager application icon shown in FIG. 3B, the electronic device 100 may display the sharing region 412 by default. In some other embodiments of this application, after the electronic device 100 detects the operation performed on the computer manager application icon shown in FIG. 3B, the electronic device 100 may display the sharing region 412 after detecting that an operation is performed on an option "Honor sharing" provided by the computer manager.

It may be understood that the above only introduces that the electronic device 100 first displays the content region 411 shown in FIG. 3B, and then displays the sharing region 412 based on the user interface 410 in FIG. 3B in a superimposed manner. In this way, the user interface shown in FIG. 3C is formed. However, the embodiments of this application do not limit an order for the electronic device 100 to display the content region 411 and the sharing region 412. In other words, the electronic device 100 may also first display the sharing region 412 and then display the content region 411.

It may be understood that the embodiments of this application do not limit positions and sizes of the display content region 411 and the display sharing region 412 of the electronic device 100 on the display screen, and the electronic device 100 may adjust the positions and sizes of both according to an operation performed by the user. For details, reference may be made to the descriptions of FIG. 3D-FIG. 3E below.

Referring to FIG. 3D-FIG. 3G, FIG. 3D-FIG. 3G Exemplarily Show that an Operation Detected by the Electronic Device 100 of Adjusting Positions of the Content Region and the Sharing Region.

Figure 3E:
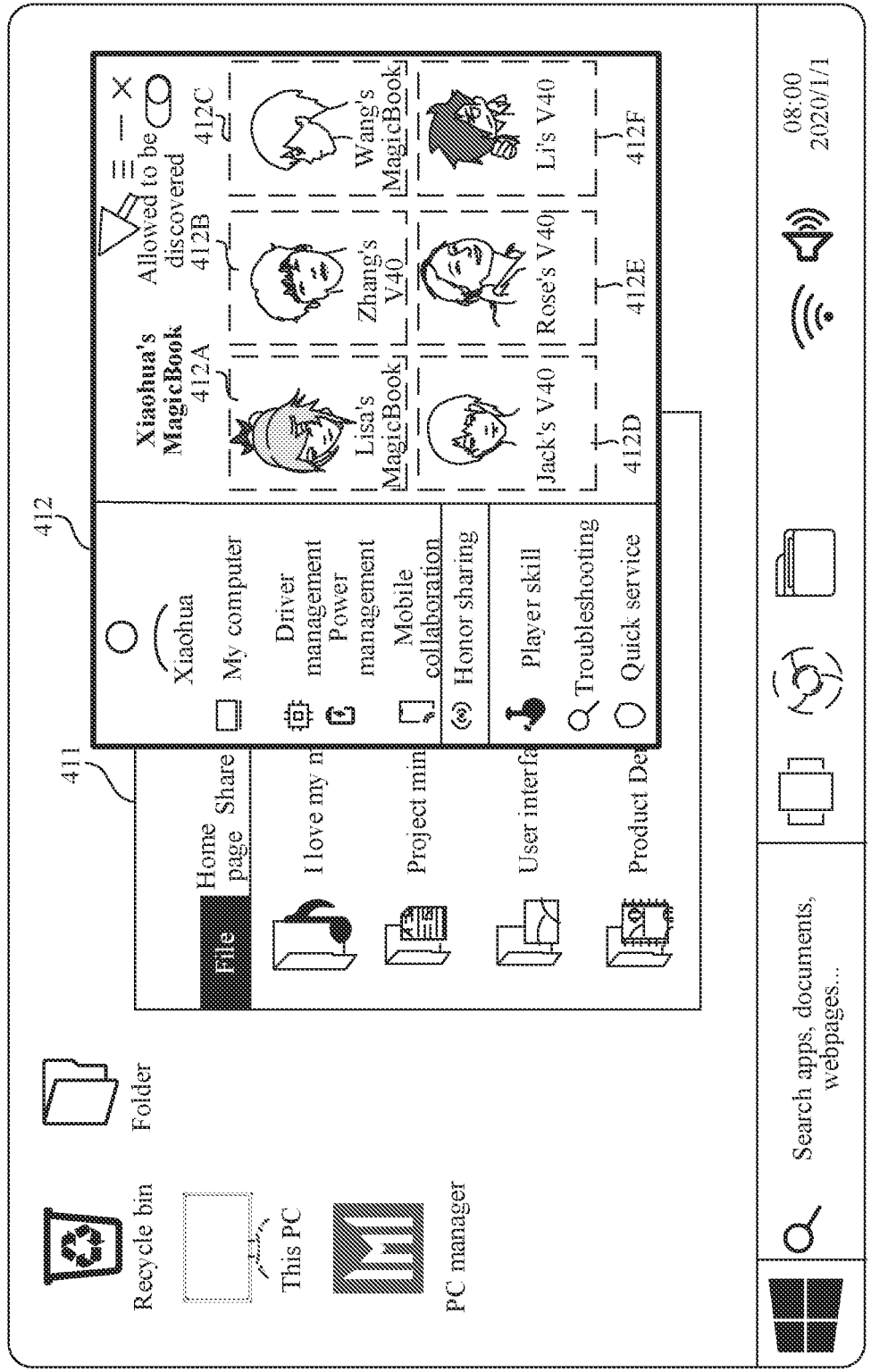

As shown in FIG. 3D, after the electronic device 100 detects that the cursor is controlled to move to an upper blank of the sharing region 412 by moving the input device 300 or moving a finger in the touchpad, and then the sharing region 412 is selected and dragged to the right of the display screen 194 for releasing, the electronic device 100 may display a user interface shown in FIG. 3E.

As shown in FIG. 3E, a display position of the sharing region 412 in the user interface 410 is moved to a right region of the display screen 194.

Figure 3F:
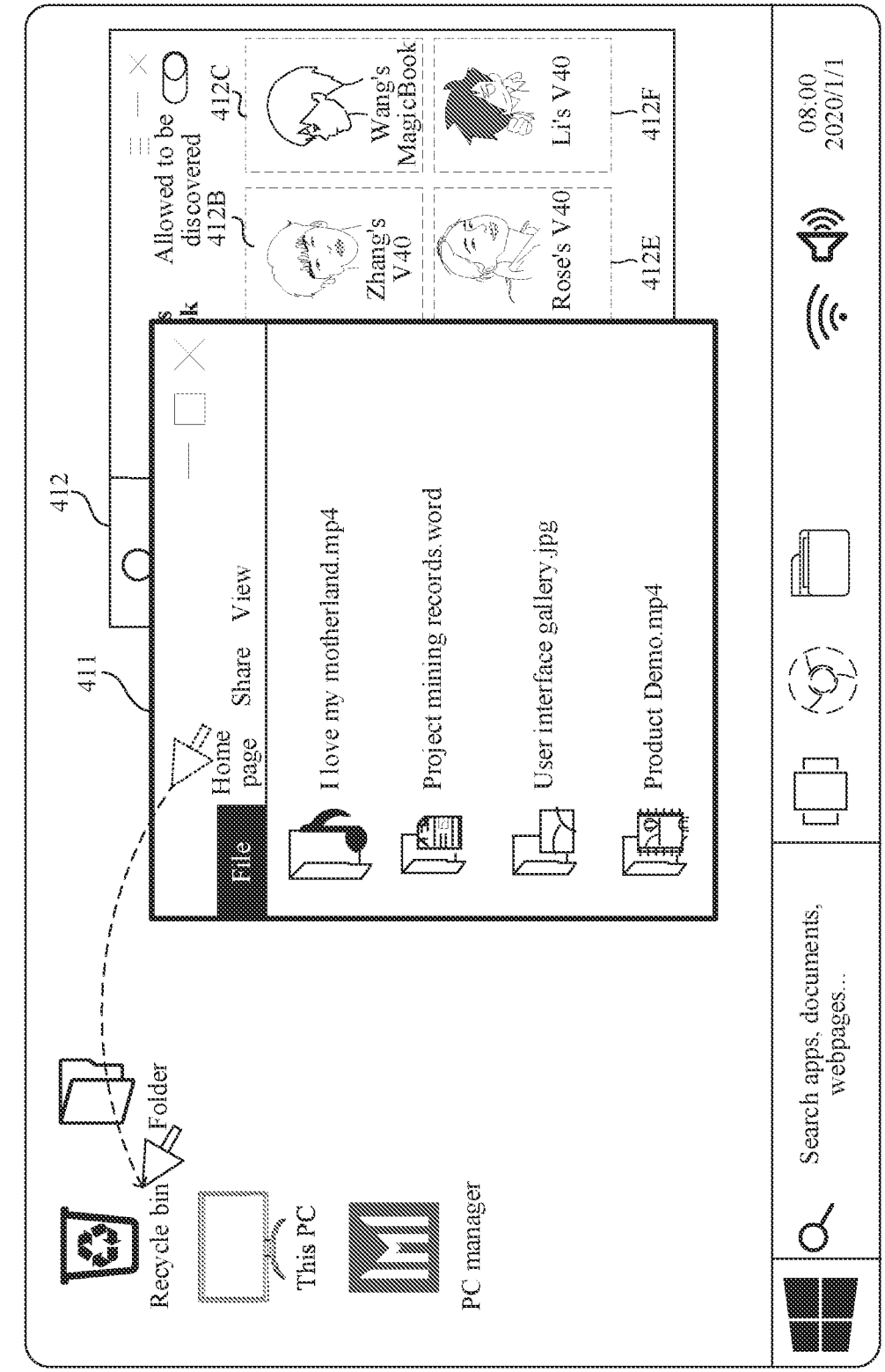
Figure 3G:
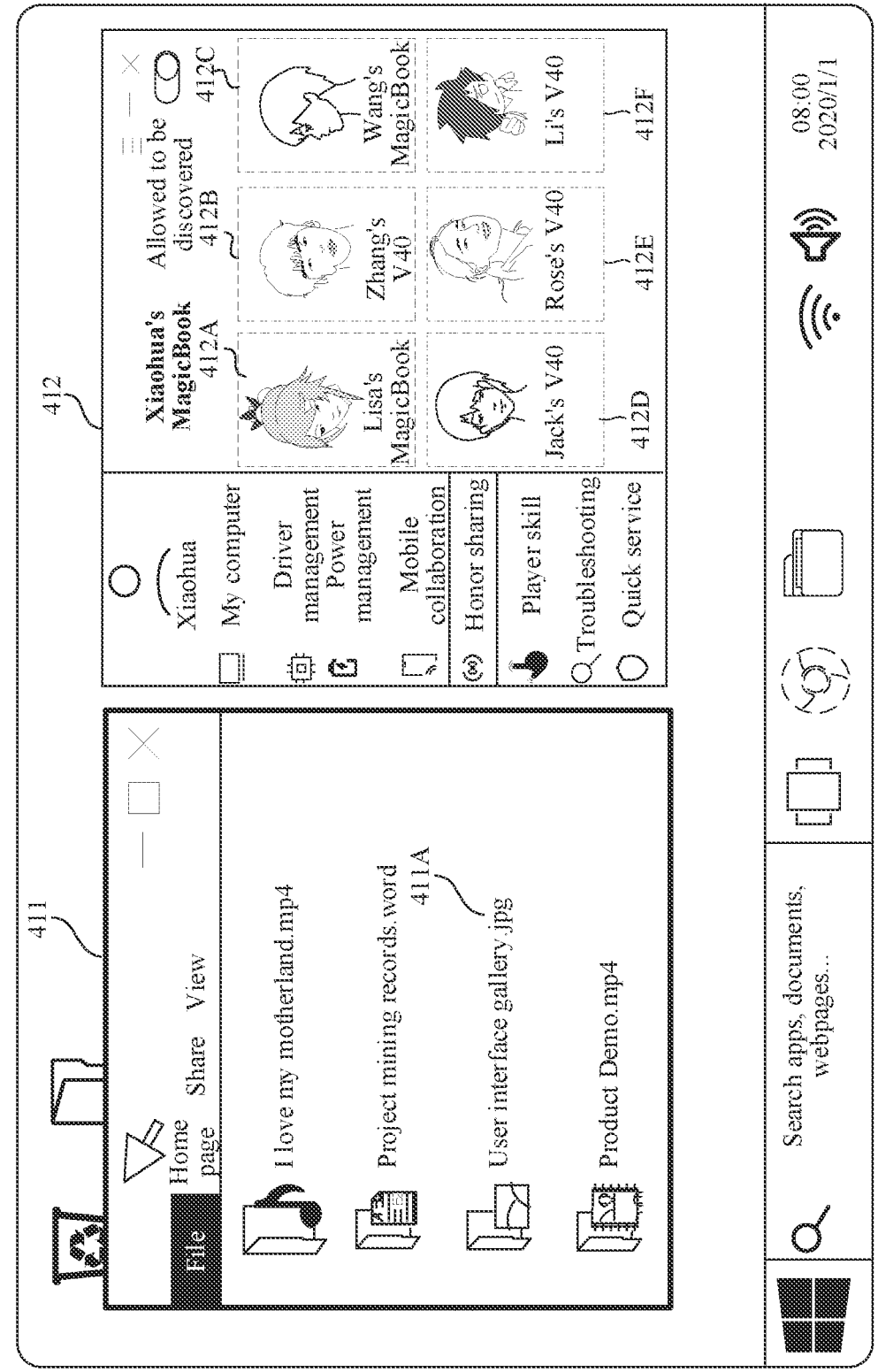

As shown in FIG. 3F, after the electronic device 100 detects that the cursor is controlled to move to an upper blank of the content region 411 by moving the input device 300 or moving a finger in the touchpad, and then the content region 411 is selected and dragged to the left of the display screen 194 for releasing, the electronic device 100 may display a user interface shown in FIG. 3G.

As shown in FIG. 3G, a display position of the content region 411 in the user interface 410 is moved to a left region of the display screen 194.

Referring to FIG. 4A-FIG. 4F, FIG. 4A-FIG. 4F Exemplarily Show a Series of Operations Performed by the Electronic Device 100 for Dragging for Sharing.

Figure 4A:
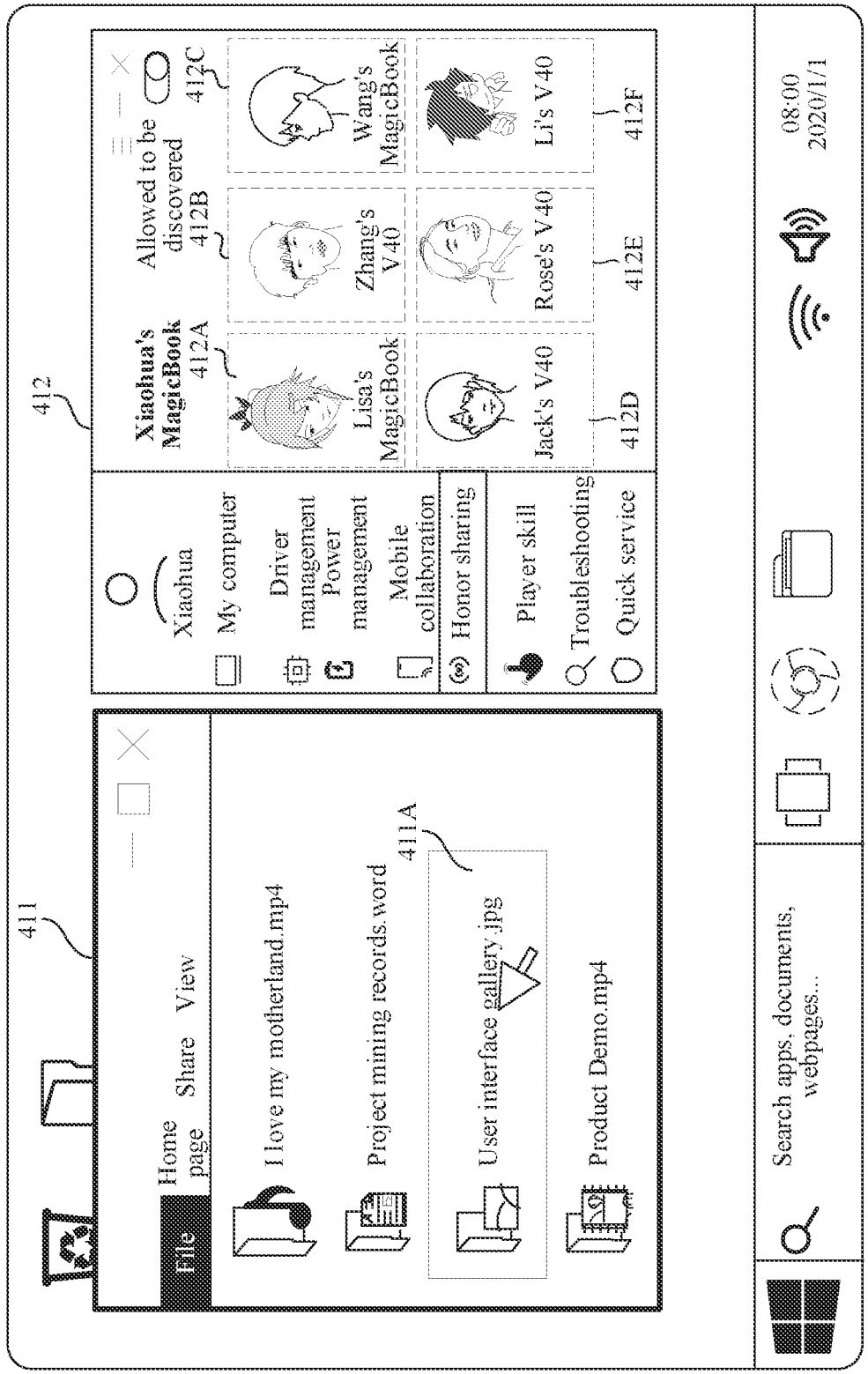
FIG. 4A to FIG. 4H are schematic diagrams of a group of user interfaces according to an embodiment of this application.
Figure 4B:
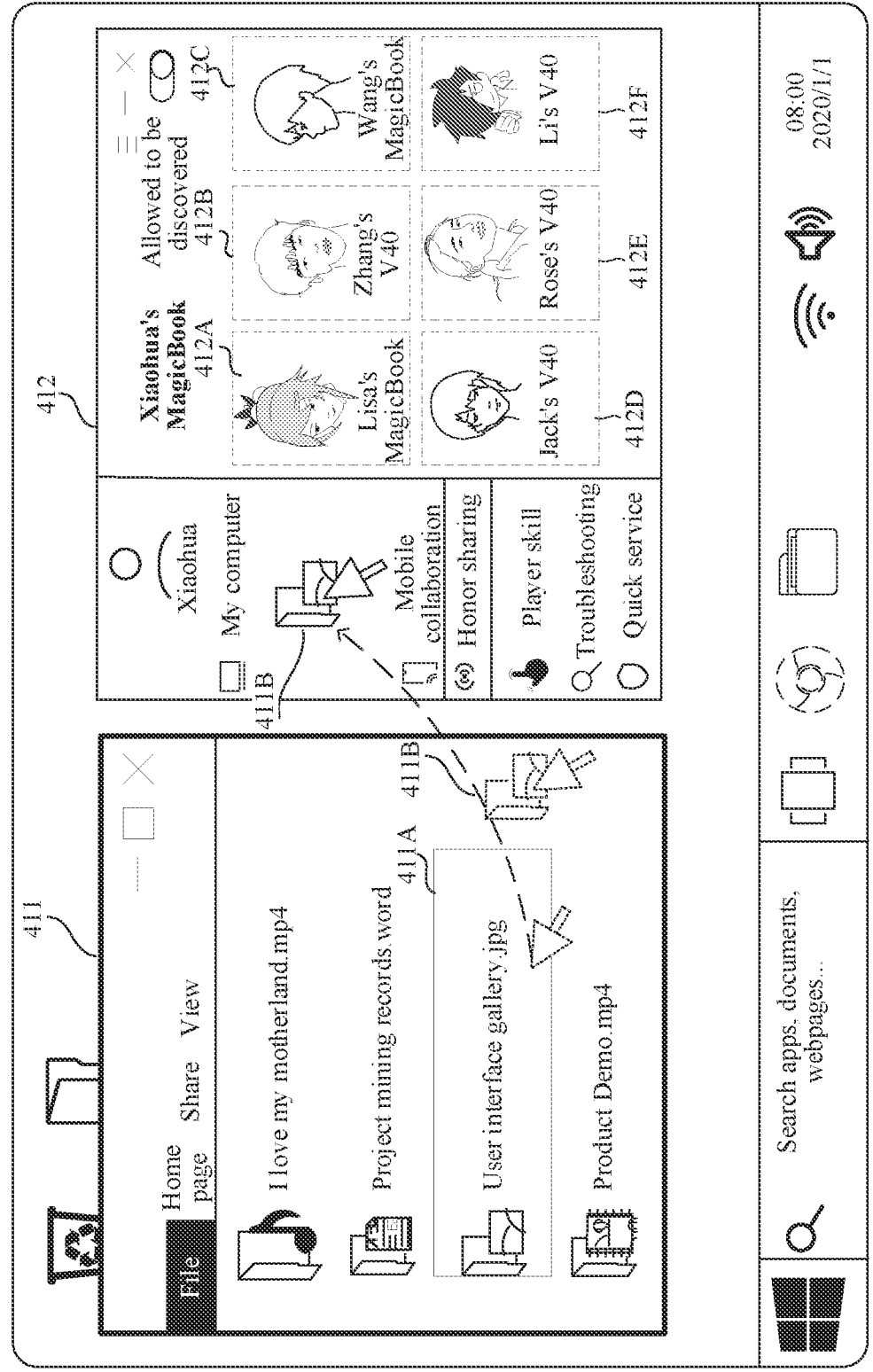

Referring to FIG. 4A-FIG. 4B, FIG. 4A-FIG. 4B exemplarily show the operation detected by the electronic device 100 of dragging the to-be-shared content to the sharing region.

As shown in FIG. 4A, when the electronic device 100 detects an operation performed on to-be-shared content 411A in the content region 411, a display state of the to-be-shared content 411A changes. For example, in some embodiments, a list item of "to-be-shared content" 411A may be highlighted to indicate that the user currently selects the to-be-shared content 411A. Not limited to highlighted display, "to-be-shared content" 411A may also present another display state (for example, underlined, shaded, or the like) to indicate that the user currently selects the to-be-shared content 411A.

It is to be noted that the operation performed on the to-be-shared content 411A in the content region 411 is as follows: The user moves the mouse to control the cursor on the display screen 194 to move to a position at which the to-be-shared content 411A is located, and presses a control in the mouse to select the to-be-shared content 411A and keeps the mouse pressed.

As shown in FIG. 4B, the electronic device 100 detects that the to-be-shared content 411A is dragged to the sharing region 411 by moving the mouse on the basis of keeping the pressed state described in FIG. 3B, and continues to keep the mouse pressed. Specifically, during the movement of the mouse, the cursor displayed on the display screen 194 may also move correspondingly according to the movement trajectory of the mouse. For a working principle of controlling the display position of the cursor on the display screen 194 through the mouse, reference may be made to the mouse described above. Details will not be repeated herein.

It should be noted that, in the process of selecting the to-be-shared content 411A and dragging the same to the sharing region 412, the electronic device 100 may also display an identifier 411B corresponding to the to-be-shared content 411A near a region where the cursor is located.

For the operation of dragging the to-be-shared content to the sharing region, reference may be made to the specific description of step S103 in the method embodiments below, and details will not be repeated herein.

It may be understood that, when the electronic device 100 detects that the to-be-shared content 411A is dragged to a to-be-shared region, the electronic device 100 is triggered to determine a possible target identifier. For the method for determining the possible target identifier, reference may be made to FIG. 4D-FIG. 4E below and the specific description of step S103 in the following method embodiments. Details will not be repeated herein.

A concept of the hot zone involved in the embodiments of this application is introduced first before the determining the possible target identifier by the electronic device is introduced.

In the embodiments of this application, the hot zone means that when a user interface is developed, each piece of content displayed on the interface may be divided into various regions, and the region is a hot zone. It is to be noted that, a size of the hot zone and a display area of content corresponding to the hot zone in the user interface may be the same or different.

Specifically, the concept of hot zone is introduced with reference to the user interface 410 shown in FIG. 4B above and FIG. 4C below.

As shown in FIG. 4B, various content is displayed in the user interface 410, such as various to-be-shared content displayed in the content region 411, an identifier of the electronic device 200 displayed in the sharing region 412, and a cursor and other controls.

For the user, a size of a region for displaying the content in the user interface is a size that can be viewed by the user. But for a user interface, each piece of content has a respective hot zone. A size of the hot zone in the user interface is invisible to the user, and a size of the region for displaying the content in the user interface and the size of the hot zone are not in a one-to-one correspondence. In other words, a size of the display region and a size of the hot zone of each piece of content in the user interface may be the same or different.

Figure 4C:
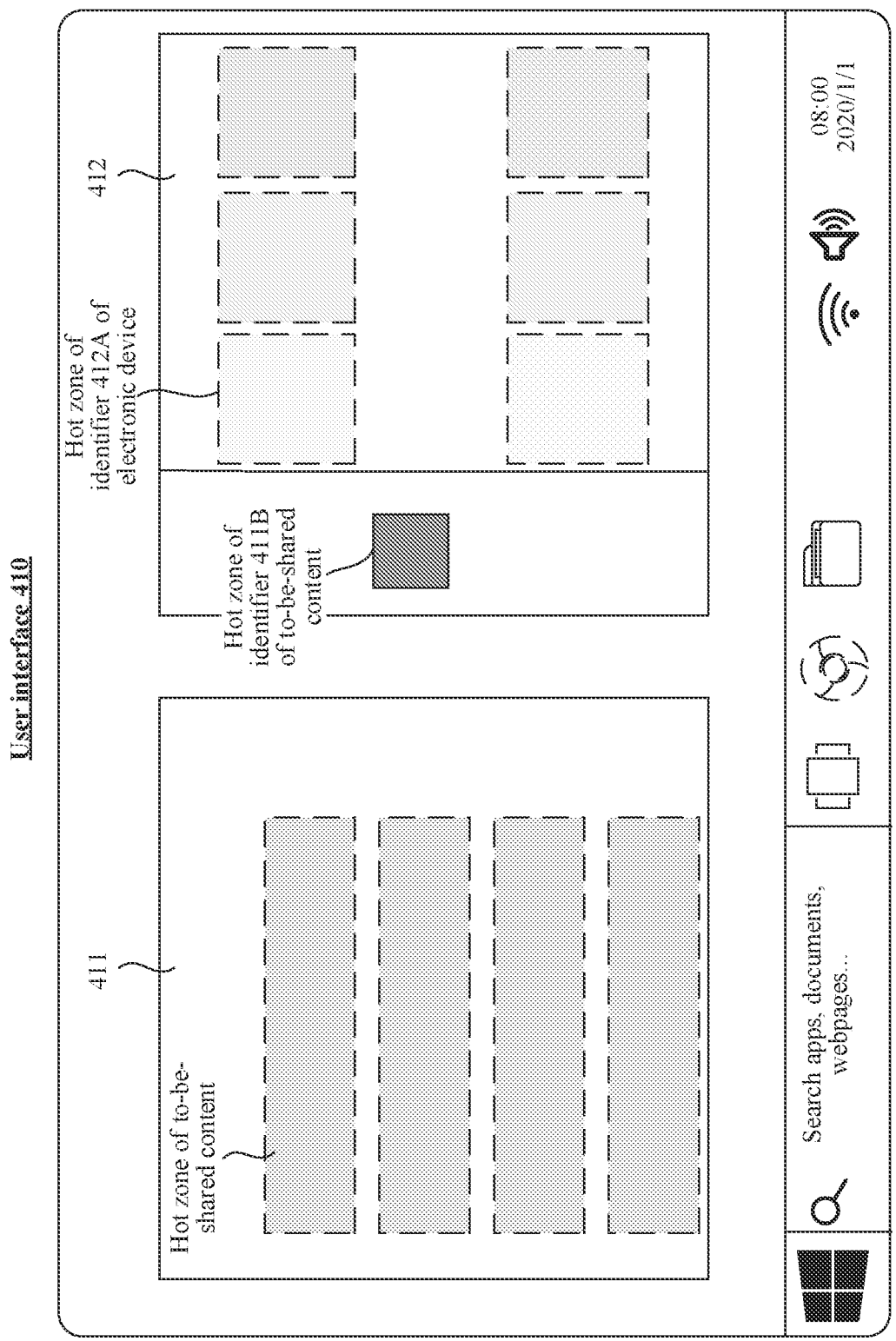

As shown in FIG. 4C, the user interface 410 displays hot zones corresponding to the content, for example, hot zones of the to-be-shared content displayed in the content region 411, and a hot zone of the identifier 411B of the to-be-shared content and a hot zone of the electronic device 200 in the process of dragging the to-be-shared content. Comparing FIG. 4B and FIG. 4C, it can be learned that a size of a display region of each piece of content in the user interface and a size of a corresponding hot zone may be the same or different, and sizes and shapes of display regions of the two may be set m advance by the developer.

Based on the Concept of the Hot Zone, the Method for Determining the Possible Target Identifier by the Electronic Device is Introduced Below with Reference to FIG. 4D and FIG. 4E.

Figure 4D:
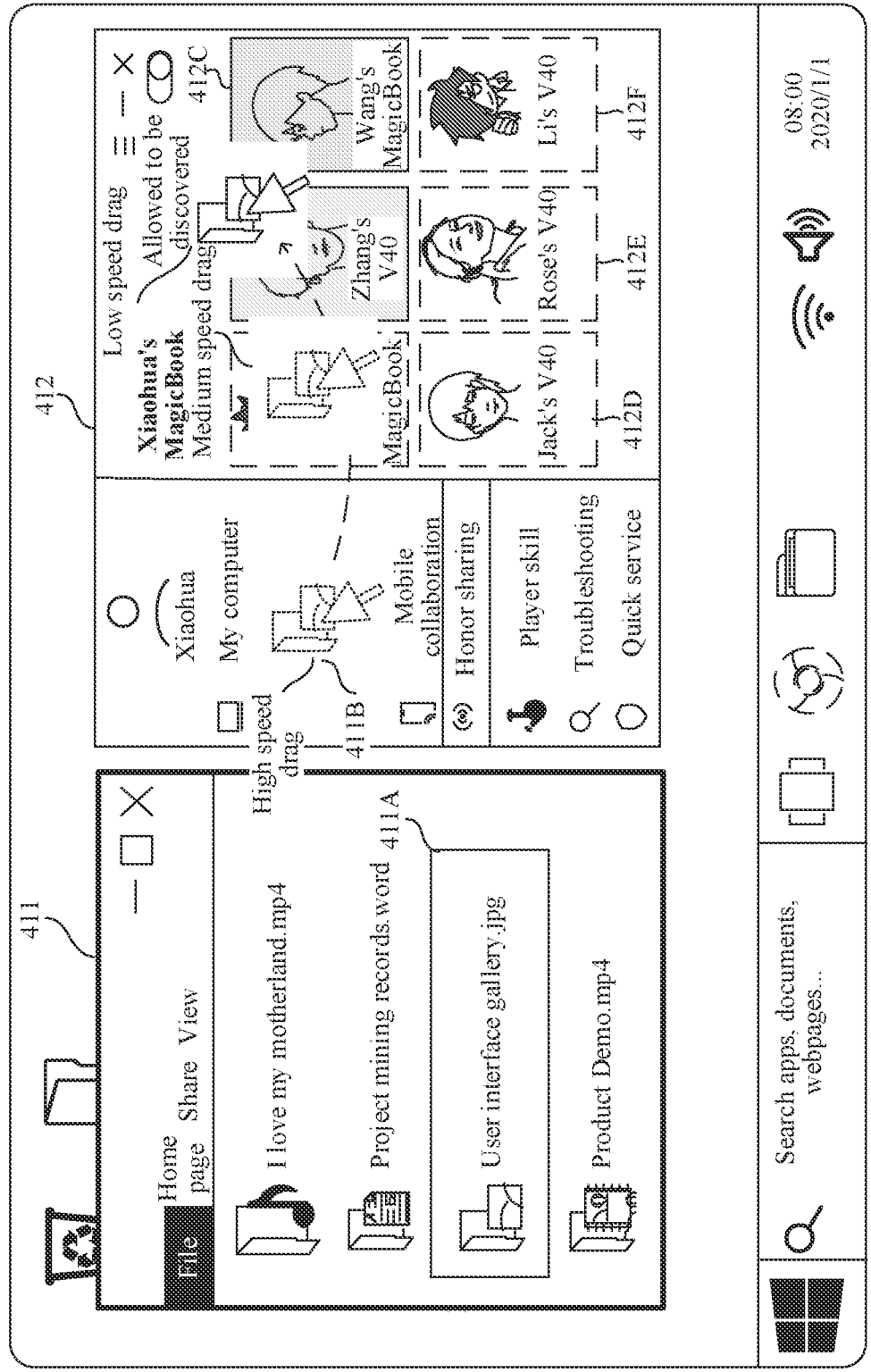

Referring to FIG. 4D, FIG. 4D Exemplarily Shows a User Interface in which the Electronic Device 100 Displays a Possible Target Identifier.

As shown in FIG. 4D, when the user drags the identifier 411B of the to-be-shared content to the to-be-shared region, the electronic device 100 may determine the possible target identifier according to information such as a drag operation inputted by the user, including a drag speed and a drag trajectory. For the method for determining the possible target identifier by the electronic device, reference may be made to FIG. 4E. After the electronic device 100 determines the possible target identifier, a display state of the possible target identifier may be changed, for example, possible target identifiers 412B and 412C are displayed in the sharing region 412 of the user interface 410. In some embodiments, 412B and 412C may be highlighted to indicate that possible target identifiers determined by the electronic device 100 are 412B and 412C. Not limited to highlighted display, 412B and 412C may also present other display states (for example, underlined, shaded, or the like) to indicate that the user currently selects 412B and 412C.

It may be understood that, the electronic device 100 displays possible target identifiers more than 412B and 412C shown in FIG. 4D, and the possible target identifiers may be freely changed according to the drag operation inputted by the user. In this embodiment of this application, 412B and 412C shown in FIG. 4D may be regarded as possible target identifiers determined by the electronic device 100 at the last time during the current drag operation. For the method for determining the possible target identifier according to the drag operation, reference may be made to the specific description of step S103 in the foregoing method embodiment, and details will not be repeated herein.

Figure 4E:
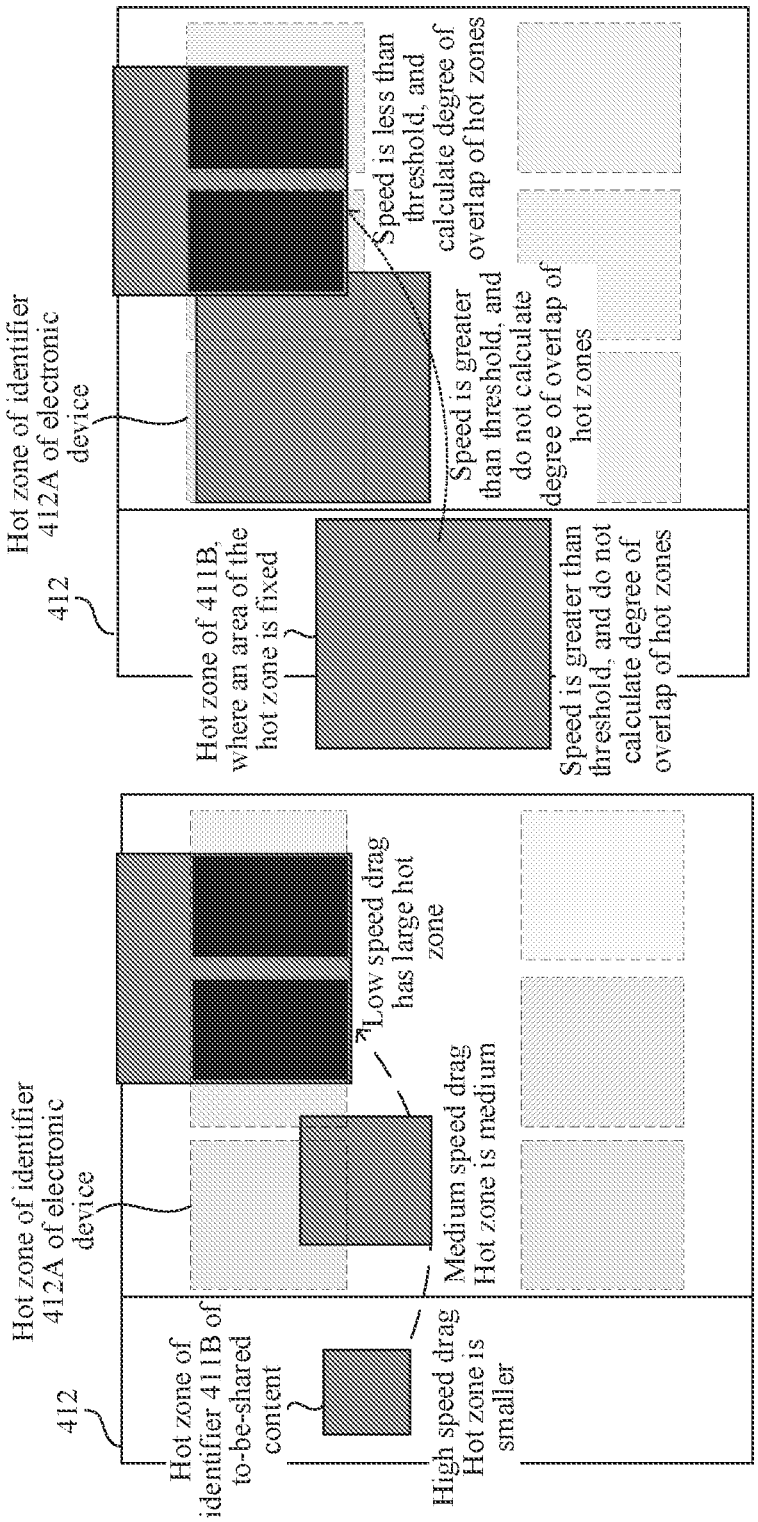

Referring to FIG. 4E. FIG. 4E Exemplarily Shows a Schematic Diagram of a Method for Determining a Possible Target Identifier by the Electronic Device 100.

In the embodiments of this application, the method for the electronic device 100 to determine the possible target identifier is performed by determining according to whether a distance between the identifier 411B of the to-be-shared content and the identifier of the electronic device 200 is greater than a first value, where whether the distance between the two is greater than the first value is determined based on the degree of overlap described below.

Detection method 1 shown in FIG. 4E: A size of a hot zone of the identifier of the electronic device 200 is fixed when the user drags the identifier 411B of the to-be-shared content to the to-be-shared region. The size of the hot zone of the identifier 411B of the to-be-shared content may change according to the drag speed inputted by the user. A higher user's drag speed indicates a smaller hot zone of the identifier 411B of the to-be-shared content. A lower user's drag speed indicates a larger hot zone of the identifier 411B of the to-be-shared content. When a degree of overlap between the hot zone of the identifier 411B of the to-be-shared content and the hot zone of the identifier of the electronic device 200 is greater than a preset area, it is considered that the identifier of the electronic device 200 is a possible target identifier.

In this embodiment of this application, the preset area may also be referred to as a third value.

Referring to FIG. 4D and FIG. 4E, when the drag speed is high or medium speed, a hot zone corresponding to the cursor is smaller. In this case, a degree of overlap between the hot zone of the cursor and the hot zone of the identifier of the electronic device 200 is more likely to be greater than the preset area is smaller. Therefore, when the user drags the identifier 411B of the to-be-shared content to the identifier 412A at a high or medium speed, a degree of overlap between a hot zone of 411B and a hot zone of 412A is less than the preset area, and therefore, 412A is not a possible target identifier. In addition, when the drag speed is low, the hot zone of 411B is larger. In this case, the degree of overlap between the hot zone of 411B and the hot zone of 412A is less likely to be greater than the preset area. Therefore, when the user drags the identifier 411B of the to-be-shared content to positions at which 412B and 412C are located, a degree of overlap between the hot zone of 411B and an area occupied by 412B and a degree of overlap between the hot zone of 411B and an area occupied by 412C are greater than the preset area. Therefore, 412B and 412C are possible target identifiers.

Detection method 2 shown in FIG. 4E: When the user drags the identifier 411B of the to-be-shared content to the to-be-shared region, the size of the hot zone of the identifier of the electronic device 200 is fixed, and the size of the hot zone of the identifier 411B of the to-be-shared content is also fixed. In this case, the size of the hot zone of the identifier 411B of the to-be-shared content is set in advance by the developer. When the user's drag speed is greater than the preset speed, the electronic device does not calculate the degree of overlap between the hot zone of the identifier 411B of the to-be-shared content and the hot zone of the identifier of the electronic device 200. When the user's drag speed is less than the preset speed, the electronic device starts to calculate the degree of overlap between the hot zone of the identifier 411B of the to-be-shared content and the hot zone of the identifier of the electronic device 200. When the degree of overlap between the hot zone of the identifier 411B of the to-be-shared content and the hot zone of the identifier of the electronic device 200 is greater than the preset area, it is considered that the identifier of the electronic device 200 is a possible target identifier.

In this embodiment of this application, the preset speed may also be referred to as a fourth value.

Referring to FIG. 4D and FIG. 4E, when the drag speed is high or medium, since the drag speed is greater than the preset speed, even though the degree of overlap between the hot zone of the identifier 411B of the to-be-shared content and the hot zone of the identifier of the electronic device 200 is greater than the preset area, the electronic device 100 does not perform an operation of calculating the degree of overlap. Therefore, when the user drags 411B to 412A at a high or medium speed, 412A is not a possible target identifier. However, when the drag speed is low, since the drag speed is lower than the preset speed, the electronic device starts to calculate the degree of overlap between the hot zones. Therefore, when the degree of overlap between an area of the identifier 411B of the to-be-shared content and an area of the identifier of the electronic device 200 is greater than the preset area, the identifier of the electronic device 200 is considered to be a possible target identifier. In other words, when the user drags 411B to positions of 412B and 412C at a speed lower than the preset speed, the electronic device 100 calculates that the degree of overlap between the hot zone of 411B and the hot zone of 412B and the degree of overlap between the hot zone of 411B and the hot zone of 412C are greater than the preset area, and therefore, 412B and 412C are possible target identifiers.

In this embodiment of this application, after the electronic device 100 determines the possible target identifier, the electronic device 100 may detect whether electronic devices corresponding to all identifiers before the possible target identifier disappear.

Figure 4F:
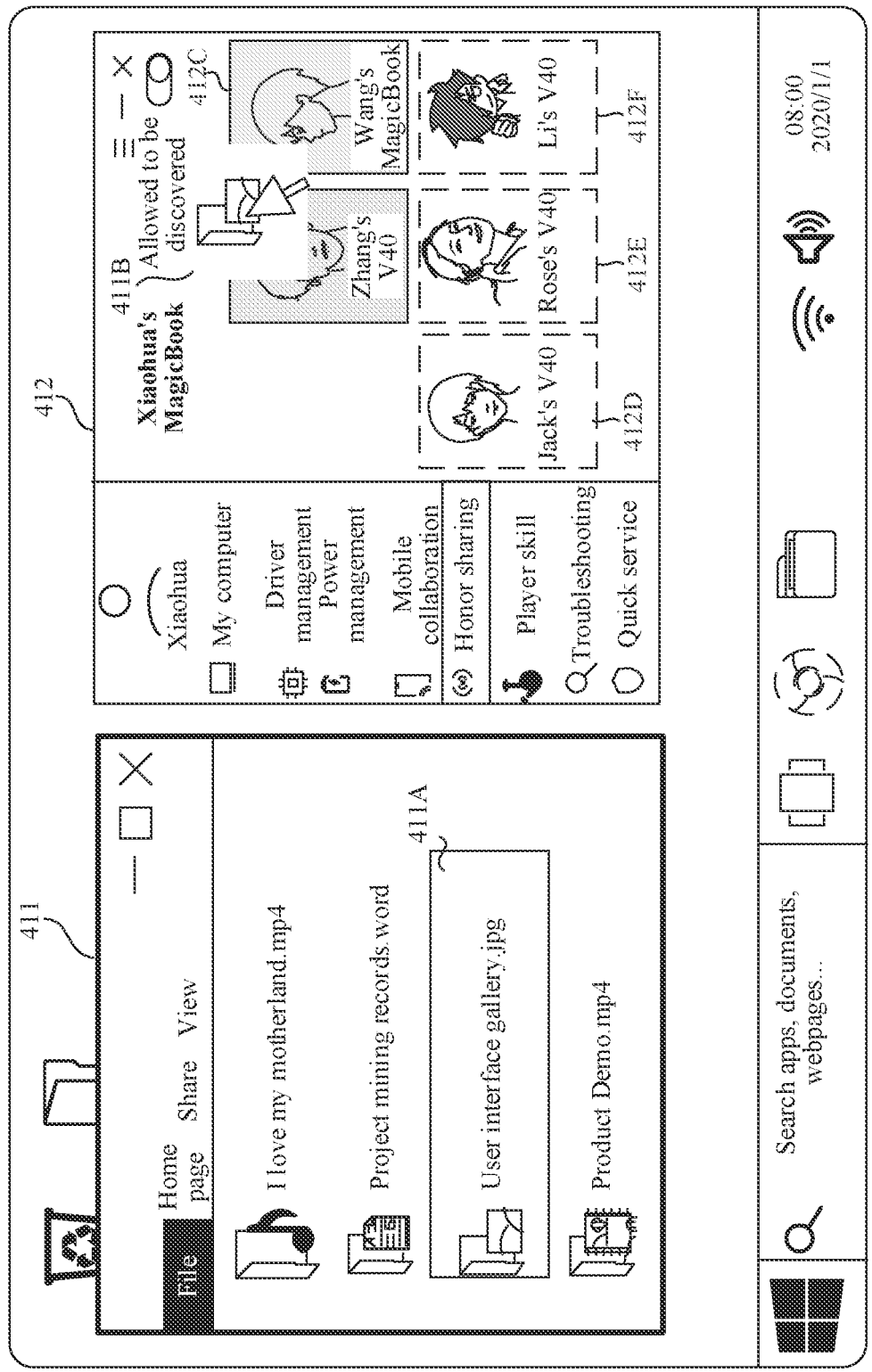

Referring to FIG. 4F, FIG. 4F Exemplarily Shows that the Electronic Device 100 Displays a User Interface in which Electronic Devices Corresponding to Identifiers Before the Possible Target Identifier Disappears.

As shown in FIG. 4F, in the sharing region 412 of the user interface 410, the identifier before the possible target identifier is, for example, 412A. The reason for the disappearance of 412A may be, for example, that the electronic device 200 corresponding to 412A disables a function found by other electronic devices, or the electronic device 200 disables the communication function, or the electronic device 200 shuts down, or a communication distance between the electronic device 200 and the electronic device 100 is farther, or the like. For the reason for the disappearance of 412A and a method for the electronic device 100 to detect the disappearance of an identifier corresponding to 412A, reference may be made to specific description of step S104 in the method embodiment below, and details will not be repeated herein.

It may be understood that, when the electronic device 100 detects that the electronic device corresponding to the identifier before the possible target identifier disappears, the electronic device 100 may keep a position of the possible target identifier in the sharing region 412 unchanged. For a specific implementation of keeping the position of the possible target identifier unchanged in the sharing region, reference may be made to the specific description of step S106 in the method embodiment above, and details will not be repeated herein.

Figure 4G:
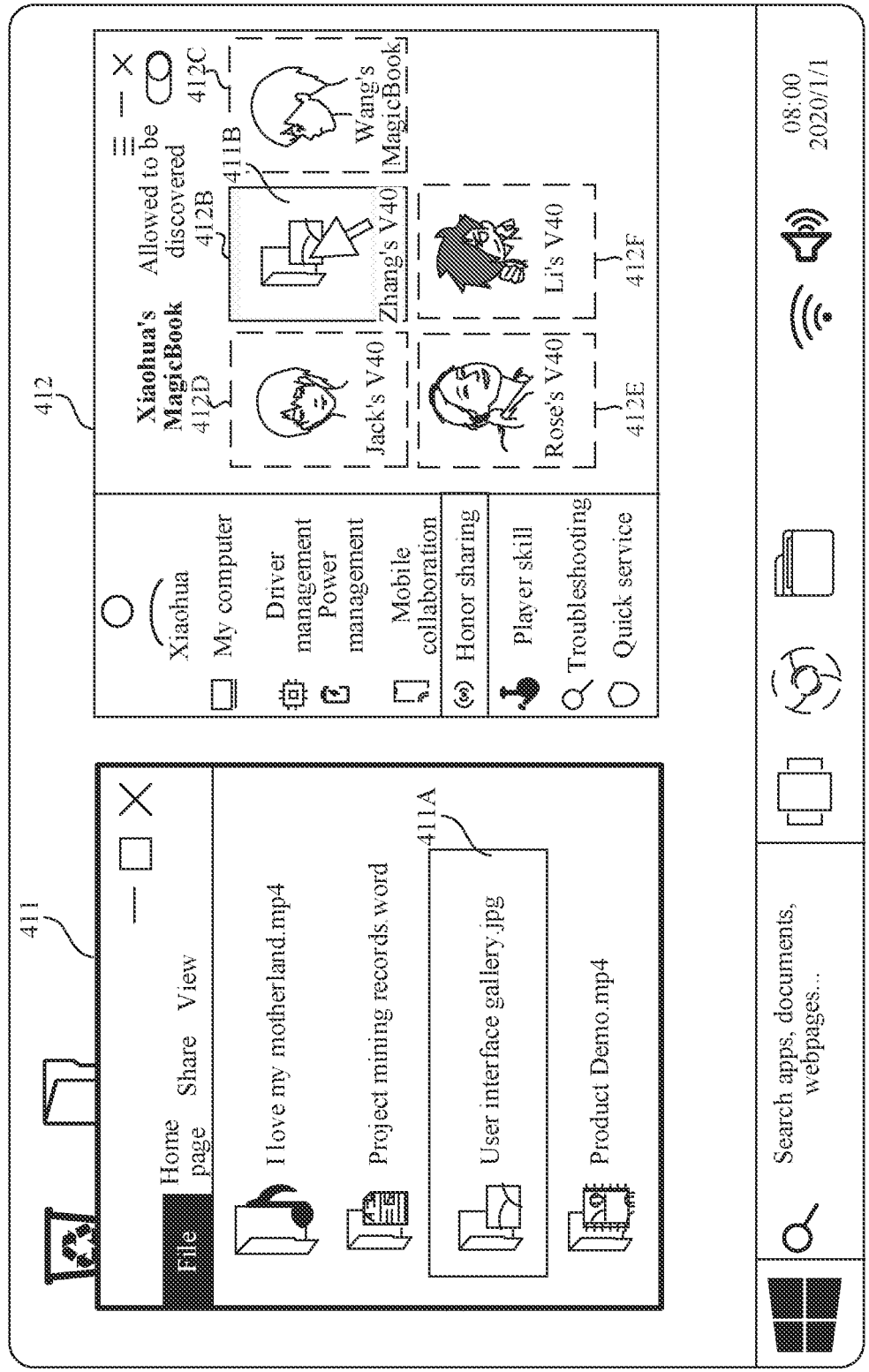

Referring to FIG. 4G, FIG. 4G Exemplarily Shows One of User Interfaces in which the Electronic Device 100 Keeps the Position of the Possible Target Identifier in the Sharing Region Unchanged.

As shown in FIG. 4G, in the sharing region 412 of the user interface 410, position of possible target identifiers 412B and 412C remain unchanged, while positions of other identifiers such as 412D, 412E, and 412F after the disappearing identifier 412A all change. Specifically, a position of the first identifier after the possible target identifier, such as 412D, is moved to the position of the original disappearing identifier 412A, and the positions of the identifiers 412E and 412F after 412D are also moved forward by one unit.

It may be understood that FIG. 4G only exemplarily shows a user interface in which the electronic device 100 keeps the position of the possible target identifier unchanged. When the electronic device 100 keeps the position of the possible target identifier remains unchanged by performing the method provided in step S106 in the foregoing method embodiment, the user interface displayed by the electronic device 100 may be the same as or different from that in FIG. 4G. This is not limited in this embodiment of this application.

Figure 4H:
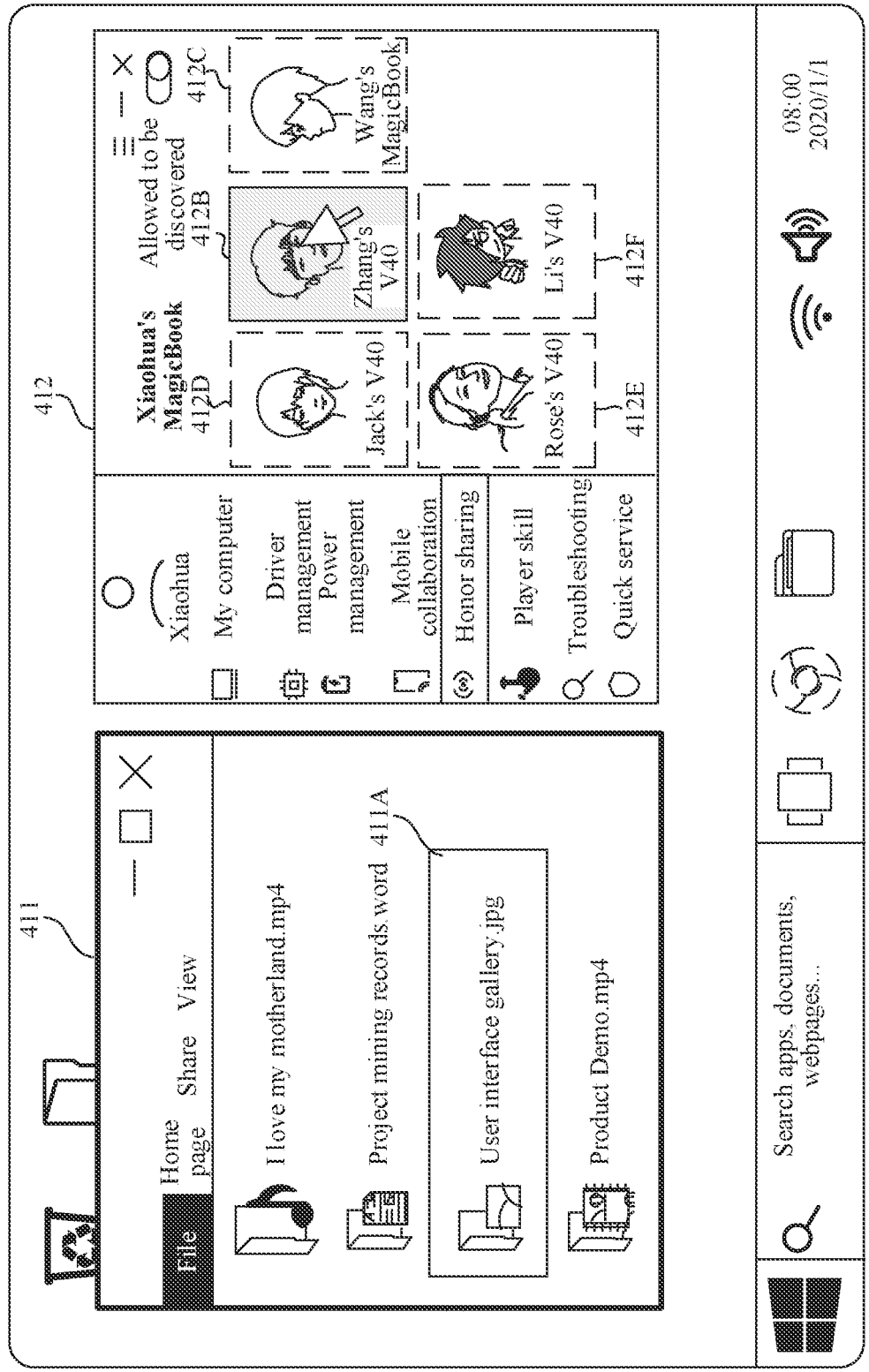

Referring to FIG. 4H, FIG. 4H Exemplarily Shows that the Electronic Device 100 Detects that the to-be-Shared Content is Dragged to the Target Identifier and Released.

As shown in FIG. 4H, when the electronic device 100 detects an operation of dragging the identifier 411B of the to-be-shared content to a target identifier such as 412B for releasing, the electronic device 100 may change a display state of the possible target identifier. For example, in some embodiments, 412B may be highlighted to indicate that the electronic device 100 currently sends the to-be-shared content 411A to an electronic device corresponding to 412B. Not limited to highlighted display, 412B may also present other display states, such as underlined, shaded. or the like. For the release operation, reference may be made to the specific description of step S105 in the method embodiments below, and details will not be repeated herein.

It is to be noted that the target identifier 412B shown in FIG. 4H is included in the possible target identifier determined by the electronic device 100 shown in FIG. 4C. In other words, the target identifier finally determined by the user is included in a possible target identifier determined by the electronic device 100 at the last time during dragging for sharing.

It is to be noted that, when the electronic device 100 displays the process of dragging and sharing, the electronic device can find a newly-added nearby electronic device whose signal strength is greater than that of the corresponding device of the possible target identifier, or the electronic device can find a newly-added nearby electronic device that is commonly used. In this case, for the user interface in which the electronic device keeps the possible target identifier unchanged, reference may be made to detailed description of FIG. 5A and FIG. 5B.

Figure 5A:
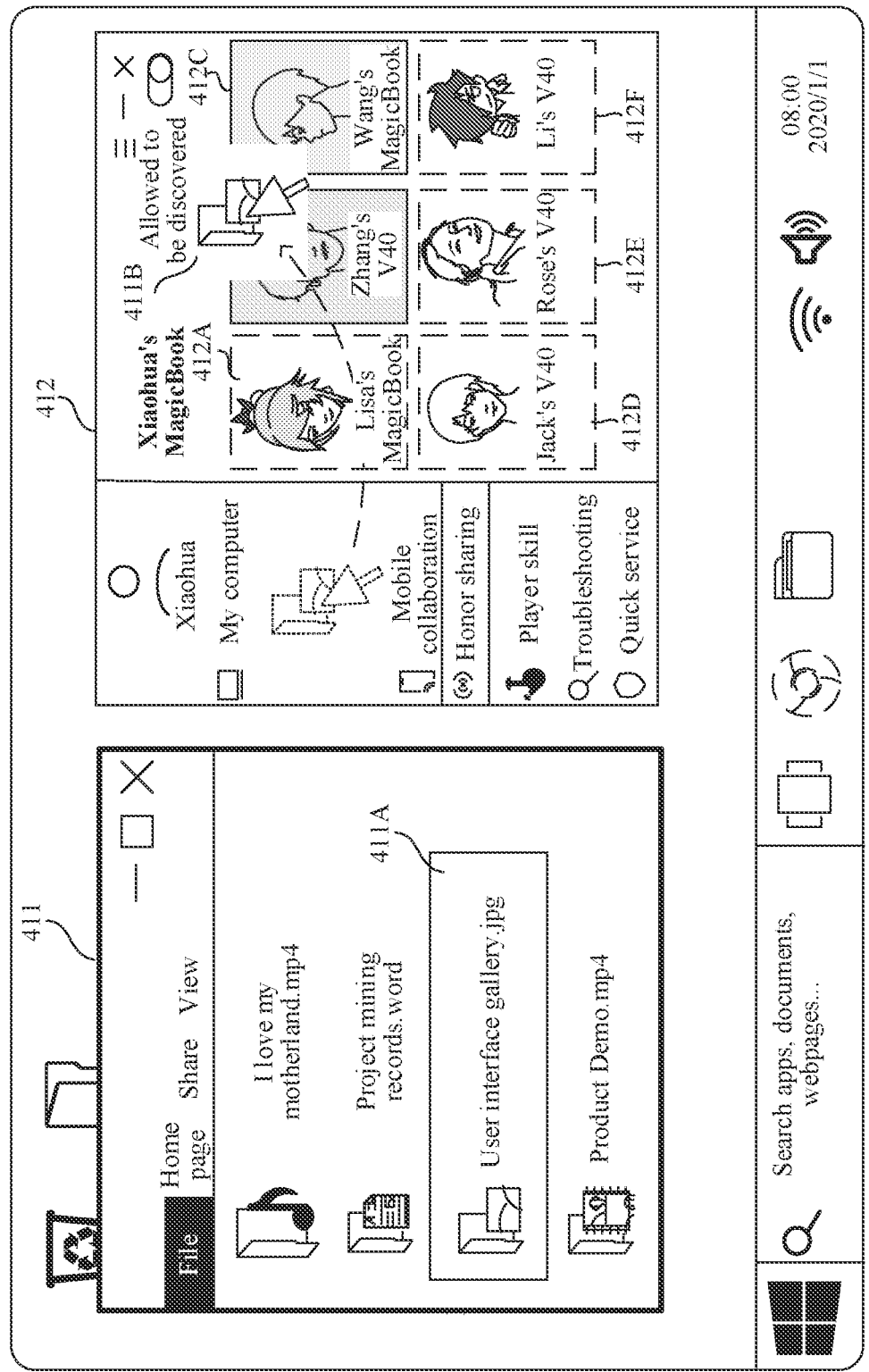
FIG. 5A and FIG. 5B are schematic diagrams of another group of user interfaces according to an embodiment of this application.
Figure 5B:
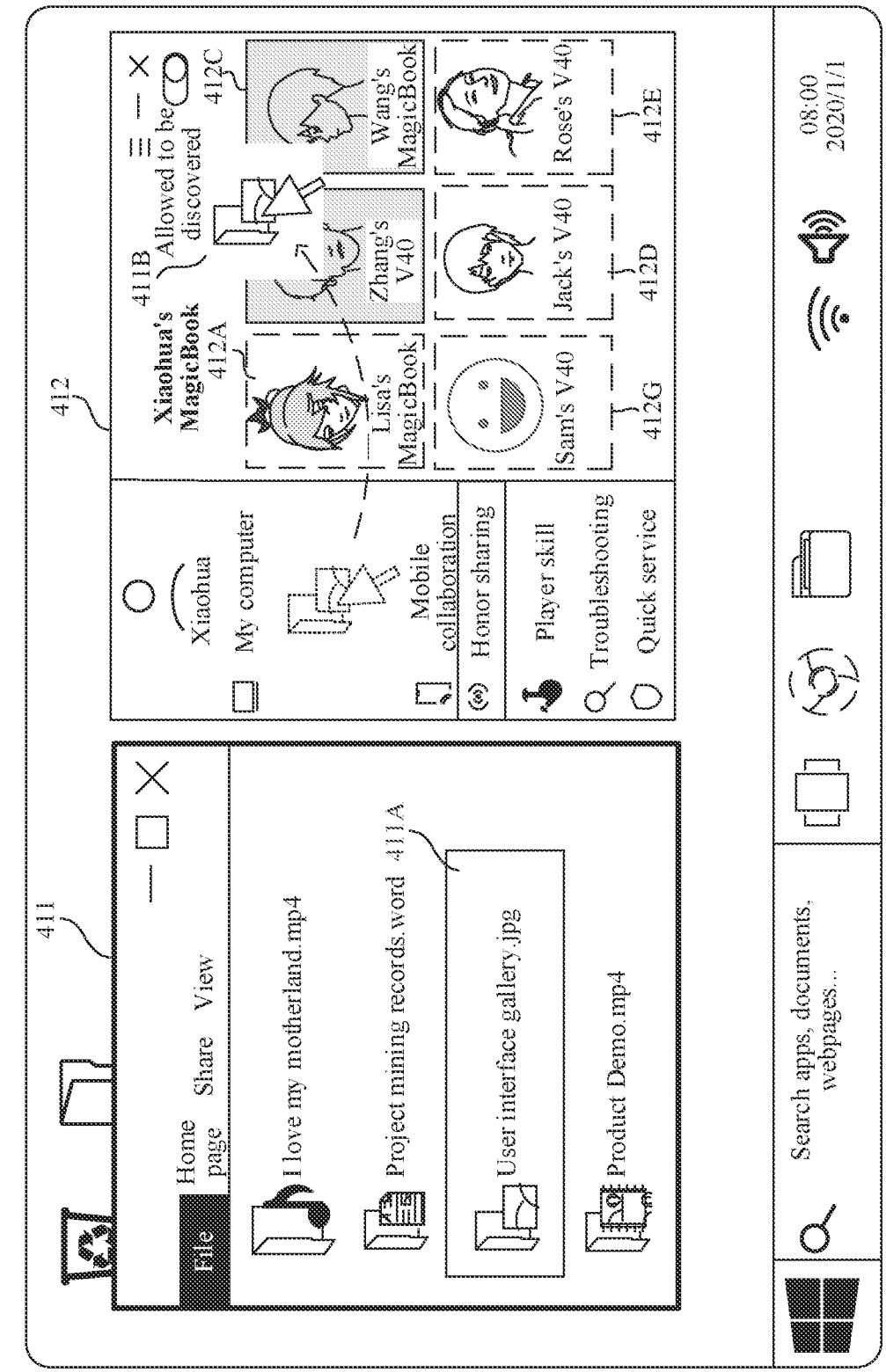

Referring to FIG. 5A and FIG. 5B, FIG. 5A and FIG. 5B Exemplarily Show a User Interface in which the Electronic Device 100 Keeps the Possible Target Identifier Unchanged when the Electronic Device 100 has Found a Newly-Added Nearby Electronic Device Whose Signal Strength is Greater than that of the Corresponding Device of the Possible Target Identifier, or the Electronic Device has Found a Newly-Added Nearby Electronic Device that is Commonly Used.

As shown in FIG. 5A, the user interface 410 is the same as a user interface shown in FIG. 4B. For the description of the user interface 410 shown in FIG. 5A, reference may be made to the description of FIG. 4B. Details will not be repeated herein.

When the electronic device 100 finds a newly-added nearby electronic device in the user interface shown in FIG. 5A, and the newly-added electronic device is a nearby electronic device whose signal strength is greater than a fifth value, and/or, the electronic device finds a newly-added nearby electronic device whose communication frequency with the electronic device 100 is greater than a sixth value, the electronic device 100 may display a user interface shown in FIG. 5B in which a display position of the possible target identifier is kept unchanged.

As shown in FIG. 5B, the user interface 410 displays an identifier 412G of a newly-added nearby electronic device, such as "Sam's V40". In this case, a display position of the identifier 412G is a display position of the first identifier 412D after the possible target identifier in FIG. 5A, and display positions of the identifier 412D shown in FIG. 5A and an identifier 412E after the identifier 412D may be automatically moved backward, thereby ensuring that the display positions of the possible target identifier 412B and 412C remain unchanged.

It may be understood that, FIG. 5B only exemplarily shows a user interface in which the position of the possible target identifier is kept unchanged, and the electronic device may also implement other methods to keep the position of the possible target identifier unchanged. In this case, the user interface displayed by the electronic device 100 may be different from the user interface shown in FIG. 5B, and may specifically correspond to the description of step S105 in the method embodiments below. Details will not be repeated herein.

The display method provided in the embodiments of this application may be described in detail below. The display method may include the following steps:

S101: The Electronic Device 100 Displays a Content Region.

The content region may be a window for the user to browse or edit content, and any one or more of the following items are displayed in the content region: an audio, text, a picture, a video, files of application installation packages, and the like. The files may be displayed in a form of a list item, or a visualized icon form, or a thumbnail of the files, or the like. This is not limited in this embodiment of this application.

The content displayed in the content region may be a system application installed in the electronic device 100, a third-party application, or provided by a mobile storage device external to the electronic device 100, such as a USB flash drive, and the like. This is not limited in this embodiment of this application.

In combination with the user interface 410 shown in FIG. 3B, the content region 411 is a content region displayed by the electronic device 100, and the content region may include a list of to-be-shared content, such as an audio, text, a picture, a video, a file of an application installation package, and the like.

S102: The Electronic Device 100 Displays a Sharing Region.

The sharing region displays an identifier of the electronic device 200. The electronic device 200 is one or more nearby electronic devices found by the electronic device 100, and the identifier may include any one or more of the following: an image, a name, a model, and the like. When there are a plurality of electronic devices 200, display rules of identifiers in this case are as follows: The identifiers may be sequentially displayed in descending order of strength of the BT signal or WLAN signal for communication for communication between the electronic device corresponding to the identifier and the electronic device 100. Alternatively, the identifiers may be displayed in descending order of communication frequency between the electronic device corresponding to the identifier and the electronic device 100.

With reference to the user interface 410 shown in FIG. 3C, the sharing region 412 is the identifier of the electronic device 200 displayed by the electronic device 100.

The process that the electronic device 100 finds the electronic device 200 is as follows: The electronic device 100 broadcasts a detection request to a nearby electronic device through a BT signal or a WLAN signal, and if a detection response from the nearby electronic device is received, the electronic device 100 considers that there are electronic devices capable of communicating nearby. The electronic devices capable of communicating are nearby one or more electronic devices 200 found by the electronic device 100. The detection response sent by the electronic device 200 may include the identifier and communication address of the electronic device, and the like. Finally, the electronic device 100 may display the identifiers of the electronic devices in the to-be-shared region according to the foregoing display rules.

It may be understood that there is no order between step S101 and step S102. In other words, an order in which the electronic device 100 displays the content region and the sharing region is not unique. For example, in some embodiments of this application, the electronic device 100 may simultaneously display the content region and the sharing region in the middle the display screen. In some other embodiments of this application, the electronic device 100 may also first display only the content region at the position, and then display the sharing region in response selecting the to-be-shared content by the user. This is not limited in this embodiment of this application.

It may be understood that a manner of displaying the content region and the sharing region described in step S101 and step S102 is not unique. For example, in some embodiments of this application, the content region and the sharing region may be simultaneously displayed as two separate regions, or may be displayed in a manner of superimposing parts of the two. In this case, superimposed content may be displayed in the content region and the sharing region through different transparency or opacity. For details, reference may be made to a series of display forms shown in FIG. 3B to FIG. 3G. Details will not be repeated herein.

In this embodiment of this application, the content region 411 is also referred to as a first window, and the sharing region 412 is also referred to as a second window.

For the user interface in which the electronic device 100 displays the content region and the sharing region, reference may be made to the embodiment of the UI below. Details will not be repeated herein.

S103: The Electronic Device 100 Determines a Possible Target Identifier According to the Detected Operation of Selecting the to-be-Shared Content and Dragging the Identifier of the to-be-Shared Content to the Sharing Region.

When the electronic device 100 detects the selected to-be-shared content inputted by the user, and drags the identifier of the to-be-shared content to the sharing region, the electronic device 100 may determine the possible target identifier according to information during the drag operation such as the movement speed and movement trajectory of the input device, or the movement speed and movement trajectory of a finger on the display screen 194 or the touchpad at the keyboard. The information such as the movement speed and movement trajectory can be obtained by analyzing information that is sent by the input device 300 and received by the electronic device 100, or may be obtained by the electronic device 100 by directly analyzing the drag operation detected by the sensor in the display screen 194 or the touchpad.

The Specific Implementation of the Operation of Selecting the to-be-Shared Content and Dragging the Same to the Sharing Region May be any of the Following:

The user moves the mouse to control the cursor on the display screen 194 to move to a position at which the to-be-shared content is located, and presses a control in the mouse to select the to-be-shared content and keeps pressing the mouse to move the mouse to drag the identifier of the to-be-shared content to the sharing region.

Alternatively, the user acts on the position of the to-be-shared content displayed on the display screen 194 with a finger or a stylus, and continues to move in the display screen 194 until the content is dragged to the sharing region.

Alternatively, the user moves the finger on the touchpad of the electronic device 100 to control the cursor in the display screen 194 to move to the position at which the to-be-shared content is located, and the cursor selects the to-be-shared content by touching or pressing the touchpad, and the finger keeps moving on the touchpad until the identifier of the to-be-shared content is dragged to the sharing region.

Alternatively, the user moves the cursor in the display screen 194 to the to-be-shared content by moving in an over-the-air manner through the handle, gloves, and the like, controls the cursor in the electronic device 100 to select the to-be-shared content by inputting the first gesture, and moves the handle or gloves to drag the identifier of the to-be-shared content to the sharing region.

With reference to FIG. 4A-FIG. 4B in the embodiment of the UI, FIG. 4A-FIG. 4B exemplarily show the operation detected by the electronic device 100 of dragging the to-be-shared content. Details will not be repeated herein.

The drag operation may also be referred to as a first operation.

The specific method for determining the possible target identifier is as follows. The electronic device 100 detects a degree of overlap between a hot zone of the identifier of the to-be-shared content dragged by the user and a hot zone of the identifier of the electronic device 200. When the degree of overlap between the hot zones is greater than the preset area, it is considered that the identifier of the electronic device 200 is a possible target identifier, where there may be one or more possible target identifiers. The specific implementation method for the electronic device 100 to calculate the degree of overlap between the hot zones may be any of the following situations:

1. When the electronic device 100 detects that the user drags the identifier of the to-be-shared content to the sharing region, the electronic device 100 is triggered to determine the possible target identifier according to the input device 300 or the drag speed and dragging trajectory of the finger.

In combination with the first manner shown in FIG. 4E, the hot zone of the identifier of the dragged to-be-shared content changes according to the drag speed, while the area occupied by the identifier of the electronic device 200 is fixed. When the drag speed is smaller, the hot zone of the identifier of the dragged to-be-shared content is larger, and vice versa.

In this way, when the drag speed is lower, it is more likely that the degree of overlap between the hot zone of the identifier of the dragged to-be-shared content and the hot zone of the identifier of the electronic device 200 is greater than the preset area. When the drag speed is higher, it is less likely that the degree of overlap between the hot zones is greater than the preset area. This is because, when the user drags the identifier of the to-be-shared content to the vicinity of the target identifier, the drag speed is usually faster, and when the user drags the identifier of the to-be-shared content to the vicinity of the target identifier, its drag speed will decrease or stop. It can be seen that such a detection method is just in line with a user's habit of inputting a drag operation to select a target identifier, and further ensures that the possible target identifier determined by the electronic device 100 includes a target identifier that meets user's expectations, thereby allowing the user to share the to-be-shared content to an electronic device corresponding to the target identifier.

2. When the electronic device 100 detects that the user drags the identifier of the to-be-shared content to the sharing region, and the drag speed of the input device 300 or the finger is lower than the preset speed, trigger the electronic device 100 to determine according to the movement trajectory of the input device 300 possible target identifier.

In combination with the second manner shown in FIG. 4E, the hot zone of the identifier of the dragged to-be-shared content is fixed, and the hot zone of the identifier of the electronic device 200 is also fixed. The hot zone of the identifier of the to-be-shared content dragged by the user may be greater than, less than, or the same as the hot zone of the identifier of the electronic device 200. The size of the areas occupied by the two on the display screen may be preset by the developer. This is not limited in this embodiment of this application.

When the electronic device 100 detects that the drag speed is lower than the preset speed, the electronic device 100 is triggered to calculate, according to the movement trajectory of the input device 300, whether the degree of overlap between the identifier of the dragged to-be-shared content and the hot zone of the identifier of the electronic device 200 is greater than the preset area. If the degree of overlap is greater than the preset area, it is determined that the identifier of the electronic device 200 is a possible target identifier. When the electronic device 100 detects that the drag speed is higher than the preset speed, the degree of overlap between the hot zones is not calculated.

In this way, it is possible to reduce the amount of computation for the electronic device 100 to detect possible target identifiers to a certain extent, and ensure that the possible target identifier determined by the electronic device 100 includes a target identifier that meets user's expectations, thereby allowing the user to share the to-be-shared content to an electronic device corresponding to the target identifier.

In this embodiment of this application, the first hot zone is a hot zone corresponding to the identifier 411B of the to-be-shared content.

S104: The Electronic Device 100 Detects that the Electronic Device Corresponding to the Identifier Before the Possible Target Identifier Disappears, or the Electronic Device Finds New-Added Another Electronic Device Whose Signal Strength is Greater than that of a Device Corresponding to the Possible Target Identifier, or the Electronic Device Finds a Newly-Added Device that is Commonly Use, the Electronic Device can Keep a Position of the Possible Target Identifier in the Display Screen Unchanged.

The electronic device 100 detects whether the electronic device corresponding to the identifier before the possible target identifier disappears. To be specific, a detection response is periodically sent to the electronic device through a BT signal or a WLAN signal, and if no detection response from the electronic device is received, the electronic device 100 considers that the electronic device is no longer within the coverage of the BT signal or the WLAN signal, that is to say, the electronic device has disappeared.

Alternatively, when the electronic device 100 receives the detection response sent by the new electronic device, and the BT signal or WLAN signal strength is greater than the threshold, the electronic device 100 considers that the electronic device is a newly-added device whose signal strength is greater than that of the corresponding device of the possible target identifier.

Alternatively, when the electronic device 100 receives the probe response sent by the new electronic device, and the electronic device 100 detects that the communication frequency with the device is greater than the threshold, the electronic device 100 considers that the electronic device is a newly-added commonly used device found by the electronic device, and the electronic device 100 may keep the position of the possible target identifier unchanged.

In this embodiment of this application, the first identifier may also be referred to as a disappearing identifier, that is, the identifier 412A. As shown in FIG. 4A-FIG. 4E, the display position of the first identifier is referred to as a first position.

The Specific Implementation for the Electronic Device 100 to Keep the Position of the Possible Target Identifier in the Sharing Region Unchanged or the Displacement of the Position is Less than the Second Value is as Follows:

Situation 1: When the electronic device 100 detects that any one or more of electronic devices corresponding to identifiers before the possible target identifier disappears:

The electronic device 100 may keep the position of the possible target identifier unchanged, so that other identifiers after the possible target identifier is moved forward. In other words, the position of the other identifiers after the possible target identifier is moved to the positions of the identifiers that have disappeared. The moving forward of the other identifiers after the possible target identifier may specifically include: moving the first identifier after the possible target identifier to the position of the identifier that has disappeared, and sequentially moving the positions of subsequent identifiers forward by one unit. Alternatively, a position of the last identifier is moved to the position of the identifier that has disappeared and positions of all other identifiers are kept unchanged. For the user interface in which the position of the possible target identifier is kept unchanged, reference may be made to the descriptions of FIG. 4G-FIG. 4H in the embodiment of the UI.

Alternatively, the electronic device 100 can control displacement change of the possible target identifier in the sharing region to be less than the second value. To be specific, the specific electronic device 100 may slow down a speed at which all the identifiers after the disappearing identifier are sequentially moved forward, so as to give the user with visual experience in which the displacement of the possible target identifier in the sharing region is almost unchanged from the drag operation to the release operation inputted by the user. After the user inputs the release operation, all the identifiers after the disappearing identifier are sequentially moved forward.

The specific implementation for the electronic device 100 to keep the position of the possible target identifier in the sharing region unchanged is not limited to the two manners described above, and there may be other manners. This is not limited in this embodiment of this application.

In this way, by using the method of keeping the position of the possible target identifier unchanged, when the identifier before the possible target identifier disappears suddenly, the display position of the possible target identifier not be suddenly moved. In other words, the position of the possible target identifier may not be moved forward. This can prevent subsequent users from dragging the to-be-shared content to an original possible target identifier and release the same at a non-possible target identifier, which may cause the user to share the to-be-shared content to an electronic device corresponding to the non-target identifier.

In the embodiments of this application, a third identifier is an identifier after the possible target identifier, for example, 412D. As shown in FIG. 4A-FIG. 4E, and a display position of the third identifier is referred to as a third position.

Situation 2: When the electronic device 100 has found a newly-added nearby electronic device whose signal strength is greater than that of the corresponding device of the possible target identifier, or the electronic device has found a newly-added nearby electronic device that is commonly used:

The electronic device 100 may keep the position of the possible target identifier unchanged, so that the identifier of the newly-added device is displayed at any position after the possible target identifier, or when the identifier is displayed before the possible target identifier, an identifier of the newly-added device may be displayed before the possible target identifier, and an identifier whose display position has been occupied is moved to any position after the possible target identifier for display. This is not limited in this embodiment of this application. For the user interface in which the position of the possible target identifier is kept unchanged, reference may be made to the descriptions of FIG. 5A-FIG. 5B in the embodiment of the UI.

In this way, by using the method of keeping the position of the possible target identifier unchanged, when the electronic device 100 has found a newly-added nearby electronic device whose signal strength is greater than that of the corresponding device of the possible target identifier, or the electronic device has found a newly-added nearby electronic device that is commonly used, the identifier of the newly-added electronic device may not be displayed before the possible target identifier and cause the position of the possible target identifier to be moved backward. This can prevent subsequent users from dragging the to-be-shared content to an original possible target identifier and release the same at a non-possible target identifier, which may cause the user to share the to-be-shared content to an electronic device corresponding to the non-target identifier.

In the embodiments of this application, a fourth identifier may also be an identifier, that is, 412G of the newly-added electronic device, such as 412D. As shown in FIG. 5B, a display position of the fourth identifier is referred to as a fourth position.

S105: The Electronic Device 100 Detects an Operation of Dragging the to-be-Shared Content to the Target Identifier, and the Electronic Device 100 Sends the to-be-Shared Content to the Electronic Device Corresponding to the Target Identifier.

Specifically, when the electronic device 100 detects the operation of dragging the to-be-shared content to the target identifier, a communication address of the corresponding electronic device may be obtained according to the target identifier, and the to-be-shared content is sent to the electronic device according to the communication address.

In this embodiment of this application, the target identifier is included in a possible target identifier determined by the electronic device 100 at the last time during the current drag operation.

The operation of dragging the to-be-shared content to the target identifier in the sharing region and releasing the same may be any of the following:

The user moves the mouse to move the to-be-shared content that has been dragged in step S103 to the target identifier, and cancels pressing the control in the mouse.

Alternatively, the user continuously moves on the display screen 194 with a finger or a stylus, moves the to-be-shared content that has been dragged in step S103 to the target identifier, and releases the finger from the display screen 194.

Alternatively, the user continuously moves the finger on the touchpad to move the to-be-shared content that has been dragged in step S103 to the target identifier, and releases the finger from the touchpad;

Alternatively, the user moves the handle, gloves, and the like to move the to-be-shared content that has been dragged in step S103 to the target identifier, and cancels pressing the control in the handle or changing a gesture.

In this embodiment of this application, the release operation may also be referred to as a second operation, and a time period from when the electronic device 100 stops displaying the first identifier to when the second operation is detected may be referred to as a second time period.

In this embodiment of this application, a second identifier may be referred to as a target identifier, that is, 412B. As shown in FIG. 4A-FIG. 4H, a display position of the second identifier is referred to as a second position. The second hot zone may also be referred to as a hot zone corresponding to the second identifier 412B.

It may be understood that an execution time of step S103-step S105 is not completely independent, this is because the user only takes a few seconds from inputting the drag operation to releasing the to-be-shared content during the dragging for sharing. Therefore, when the electronic device 100 performs detection as described in step S103 and drags the to-be-shared content to the sharing region, a possible target identifier may be determined in real time according to information such as a drag speed and a drag trajectory, where the possible target identifier may be changed according to the information such as the drag speed and the drag trajectory. In addition, the electronic device 100 also performs step S104, to keep the position of the possible target identifier unchanged.

Figure 6:
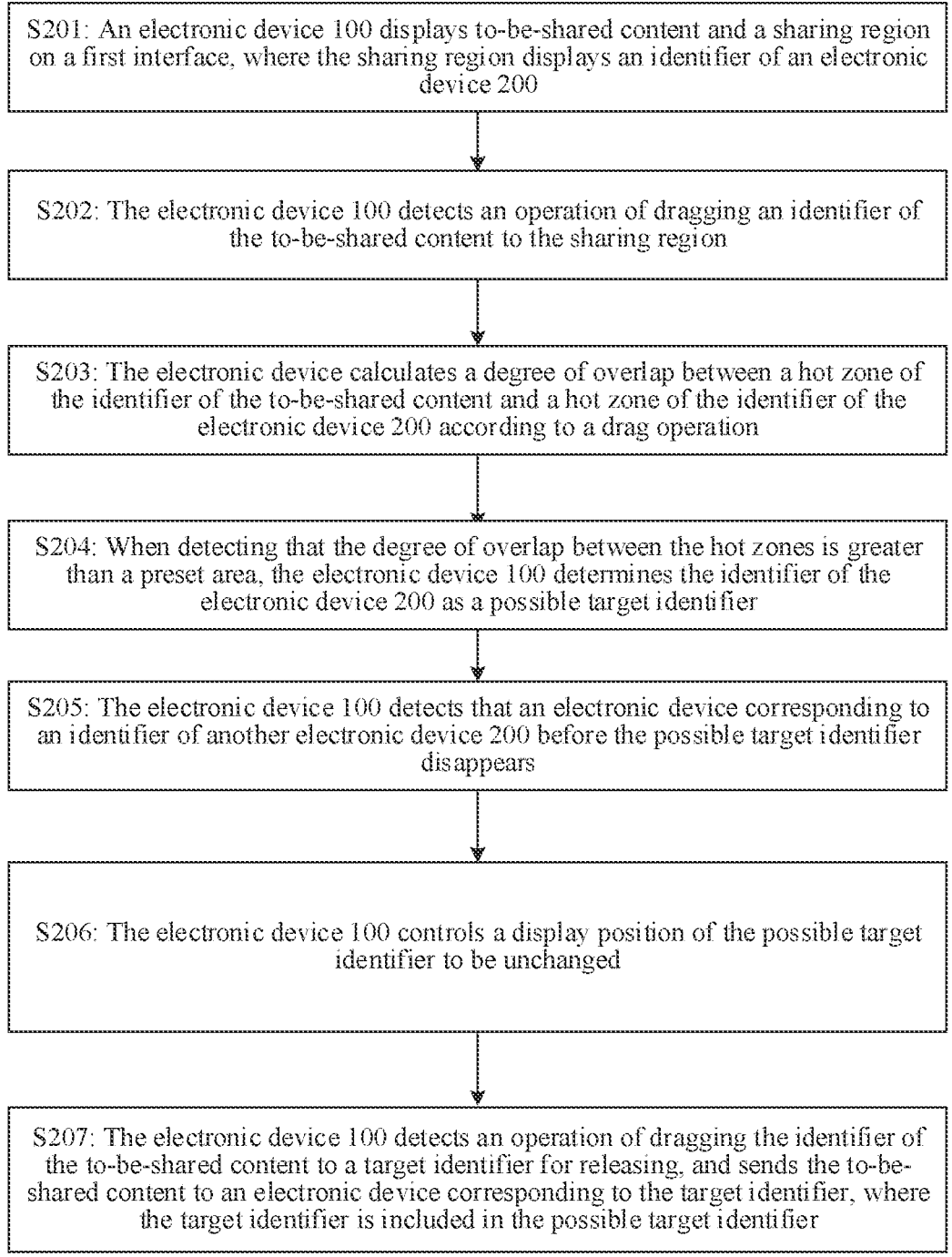
FIG. 6 is a flowchart of a method according to an embodiment of this application.

The Process of the Display Method in the Embodiments of this Application is Described Below with Reference to FIG. 6 in a Specific Dragging for Sharing Scenario.

S201: the electronic device 100 displays the to-be-shared content and the sharing region on a first interface, and the sharing region displays an identifier of the electronic device 2).

Referring to FIG. 3G, FIG. 3G shows the user interface 410 displayed by the electronic device 100, the user interface 410 is a first interface. The first interface displays a content region 411 and a sharing region 412. The content region 411 displays to-be-shared content such as 411A and the like. The sharing region 410 displays an identifier of the electronic device 200, such as 412A. 412B, 412C, 412D, or the like. For the detailed description of the first interface, reference may be made to the description of a series of user interfaces shown in FIG. 3A-FIG. 3F in the embodiment of the UI. Details are not described herein.

In this embodiment of this application, the content region 411 is also referred to as a first window, and the sharing region 412 is also referred to as a second window.

S202: The electronic device 100 detects an operation of dragging the identifier of the to-be-shared content to the sharing region.

Referring to FIG. 4A-FIG. 4B, FIG. 4A-FIG. 4B show the operation detected by the electronic device 100 of dragging the to-be-shared content to the sharing region. The specific implementation of the drag operation may include the following:

The user moves the mouse to control the cursor on the display screen 194 to move to a position at which the to-be-shared content is located, and presses a control in the mouse to select the to-be-shared content and keeps pressing the mouse to move the mouse to drag the identifier of the to-be-shared content to the sharing region.

Alternatively, the user acts on the position of the to-be-shared content displayed on the display screen 194 with a finger or a stylus, and continues to move in the display screen 194 until the identifier of the to-be-shared content is dragged to the sharing region.

Alternatively, the user moves the finger on the touchpad of the electronic device 100 to control the cursor in the display screen 194 to move to the position at which the to-be-shared content is located, and the cursor selects the to-be-shared content by touching or pressing the touchpad, and the finger is kept moving on the touchpad until the identifier of the to-be-shared content is dragged to the sharing region.

Alternatively, the user moves the cursor in the display screen 194 to the to-be-shared content by moving in an over-the-air manner through the handle, gloves, and the like, controls the cursor in the electronic device 100 to select the to-be-shared content by inputting the first gesture, and moves the handle or gloves to drag the identifier of the to-be-shared content to the sharing region.

In the embodiments of this application, the drag operation may also be referred to as a first operation.

S203: The electronic device 100 calculates the degree of overlap between the hot zone of the identifier of the to-be-shared content and the hot zone of the identifier of the electronic device 200 according to the drag operation.

For the concept of the hot zone, reference may be made to the detailed explanation of FIG. 4B-FIG. 4C in the embodiment of the UI, and details will not be repeated herein.

Combining with the first method in FIG. 4D, it can be learned that the electronic device 100 may the degree of overlap between the hot zone of the identifier of the to-be-shared content and the hot zone of the identifier of the electronic device 200 according to the related information of the drag operation inputted by the user, including the drag speed and drag trajectory. Specifically, the electronic device 100 may control the size of the hot zone of the identifier of the electronic device 200 to remain unchanged, and the size of the hot zone of the identifier of the to-be-shared content changes with the drag speed. A lower drag speed indicates a larger hot zone of the identifier of the to-be-shared content. The electronic device may also determine the position of the identifier of the to-be-shared content relative to the identifier of the electronic device 200 according to the drag trajectory, so that the electronic device 100 may calculate the degree of overlap between the hot zone of the identifier of the to-be-shared content and the hot zone of the identifier of the electronic device 200 according to the drag operation.

S204: The electronic device 100 detects that the degree of overlap between the hot zones is greater than a preset area, and then determines that the identifier of the electronic device 200 is a possible target identifier.

Referring to FIG. 4D, FIG. 4D exemplarily shows possible target identifiers 412B and 412C determined by the electronic device, and the identifiers 412B and 412C are identifiers of the electronic device 200 that meets a requirement that the degree of overlap between the hot zone of the identifier of the to-be-shared content and the hot zone of the identifier of the electronic device 200 is greater than the preset area.

S205: The electronic device 100 detects that an electronic device corresponding to an identifier of another electronic device 200 before the possible target identifier disappears.

When the electronic device 100 detects that any one or more identifiers in the electronic device 200 before the possible target identifier, for example, in other words, when an electronic device corresponding to the identifier 412A disappears, the electronic device corresponding to the identifier 412A disables a function found by the electronic device 100 or suddenly disables a communication function, or shuts down itself, or when a communication distance with the electronic device 100 becomes farther, the electronic device 100 may stop displaying the identifier 412A. For details, reference may be made to the detailed description in FIG. 4F. Details will not be repeated herein.

S206: The electronic device 100 controls the display position of the possible target identifier to remain unchanged.

The electronic device 100 may keep the position of the possible target identifier unchanged, so that other identifiers after the possible target identifier is moved forward. In other words, the position of the other identifiers after the possible target identifier is moved to the positions of the identifiers that have disappeared. The moving forward of the other identifiers after the possible target identifier may specifically include: moving the first identifier after the possible target identifier to the position of the identifier that has disappeared, and sequentially moving the positions of subsequent identifiers forward by one unit. Alternatively, a position of the last identifier is moved to the position of the identifier that has disappeared and positions of all other identifiers are kept unchanged. For the user interface in which the position of the possible target identifier is kept unchanged, reference may be made to the descriptions of FIG. 4G-FIG. 4H in the embodiment of the UI.

Alternatively, the electronic device 100 can control displacement change of the possible target identifier in the sharing region to be less than the second value. To be specific, the specific electronic device 100 may slow down a speed at which all the identifiers after the disappearing identifier are sequentially moved forward, so as to give the user with visual experience in which the displacement of the possible target identifier in the sharing region is almost unchanged from the drag operation to the release operation inputted by the user. After the user inputs the release operation, all the identifiers after the disappearing identifier are sequentially moved forward.

The specific implementation for the electronic device 100 to keep the position of the possible target identifier in the sharing region unchanged is not limited to the two manners described above, and there may be other manners. This is not limited in this embodiment of this application. For the user interface in which the position of the possible target identifier is kept unchanged, reference may be made to the descriptions of FIG. 4F-FIG. 4G in the embodiment of the UI.

S207: The electronic device 100 detects an operation of dragging the identifier of the to-be-shared content to the target identifier, and sends the to-be-shared content to an electronic device corresponding to the target identifier, where the target identifier is included in the possible target identifier.

Referring to FIG. 4G-FIG. 4H, when the electronic device 100 detects the operation of dragging the to-be-shared content to the target identifier, a communication address of the corresponding electronic device may be obtained according to the target identifier, and the to-be-shared content is sent to the electronic device according to the communication address. For the specific implementation of the operation of dragging the identifier of the to-be-shared content to the target identifier for releasing, reference may be made to the detailed description of step S105. Details will not be repeated herein.

It can be seen that, after implementing the method provided in this embodiment of this application, in a process in which the user performs a drag operation to share content, the electronic device 100 may determine, according to the drag operation, that the position of the possible target identifier remains unchanged. Since the target identifier is included in the possible target identifier, the user may accurately drag the dragged to-be-shared content to the target identifier for releasing, to send the to-be-shared content to the electronic device corresponding to the target identifier. In this way, it can be avoided that the identifier before an identifier of a possible target user suddenly disappears, or when the electronic device 100 finds a nearby electronic device whose signal strength is greater than that of a device corresponding to the possible target identifier, or the electronic device finds a newly-added nearby electronic device that is commonly used, the position of the possible target identifier changes, which causes the position of the target identifier to change, and finally causes the user to drag the to-be-shared content to a non-target identifier. As a result, the electronic device 100 sends the to-be-shared content to an electronic device corresponding to the non-target identifier. In other words, the electronic device may ensure that the user shares the to-be-shared content to the electronic device corresponding to the target identifier.

The implementation of this application may be randomly combined to achieve different technical effects.

All or some of the foregoing embodiments may be implemented by using software, hardware, firmware, or any combination thereof. When software is used for implementation, all or some of the embodiments may be implemented in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

A person of ordinary skill in the art may understand that all or some of the procedures in the methods in the embodiments may be implemented by using a computer program instructing relevant hardware. The program may be stored in a computer-readable storage medium. When the program runs, the procedures in the foregoing method embodiments may be performed. The foregoing storage medium includes: any medium that can store program code, such as a ROM, a random access memory RAM, a magnetic disk, or an optical disc.

In conclusion, the foregoing descriptions are only embodiments of the technical solutions of the present invention, but are not intended to limit the protection scope of the present invention. Any modification, equivalent substitution, and improvement made according to the disclosure of the present invention shall fall within the protection scope of the present invention.

What is claimed is:

1. A display method, applied to an electronic device, the method comprising:
    finding, by the electronic device, a plurality of devices within a first time period;
    displaying, by the electronic device, a first window and a second window, wherein an identifier of to-be-shared content is displayed in the first window, identifiers corresponding to the plurality of devices are displayed in the second window, and the identifiers of the devices are displayed in the second window in a preset order, wherein the identifiers of the devices comprise a first identifier and a second identifier, and wherein the electronic device displays the first identifier at a first position in the second window, and then displays the second identifier at a second position in the second window;
    detecting, by the electronic device, a first operation of dragging the identifier of the to-be-shared content to the second window;
    stopping, by the electronic device, the display of the first identifier during a process of receiving the first operation;
    detecting, by the electronic device during the process of receiving the first operation, that a distance between the second identifier and the identifier of the to-be-shared content is less than a first value;
    detecting, by the electronic device, a second operation on the second identifier;
    sharing, by the electronic device, the to-be-shared content with a device corresponding to the second identifier in response to the second operation; and
    controlling, by the electronic device within a second time period from a moment when the electronic device stops the display of the first identifier to a moment when the electronic device detects the second operation, either a) a display position of the second identifier in the second window to remain unchanged, or b) displacement of a display position of the second identifier in the second window to be less than a second value.

2. The display method of claim 1, wherein detecting that the distance between the second identifier and the identifier of the to-be-shared content is less than the first value comprises detecting, by the electronic device, that a degree of overlap between a first hot zone and a second hot zone is greater than a third value, wherein the first hot zone is a region in which the identifier of the to-be-shared content is displayed, and wherein the second hot zone is a region in which the second identifier in the second window is displayed.

3. The display method of claim 2, wherein a size of the first hot zone remains unchanged, and a size of the second hot zone remains unchanged or increases as a drag speed of the second operation decreases.

4. The display method of claim 1, wherein the electronic device fails to find the device corresponding to the second identifier after the first time period and before the electronic device stops displaying the first identifier.

5. The display method of claim 1, wherein the identifiers of the devices further comprise a third identifier, and the method further comprises:
    displaying, by the electronic device, the third identifier at a third position in the second window after displaying the second identifier at the second position; and
    displaying, by the electronic device, the third identifier at the first position after stopping the display of the first identifier.

6. The display method of claim 1, wherein controlling displacement of the display position of the second identifier in the second window to be less than the second value comprises:
controlling, by the electronic device, a movement speed of the second identifier at the display position in the second window to be less than a fourth value after the electronic device stops the display of the first identifier; and
controlling, by the electronic device when detecting the second operation, the displacement of the display position of the second identifier in the second window to be less than the second value.

7. The display method of claim 1, wherein displaying the identifiers of the devices in the second window in the preset order comprises one of:
a) sequentially displaying, by the electronic device, the identifiers of the plurality of devices in the second window in descending order of strength of signals for communication with the plurality of devices; or
b) sequentially displaying, by the electronic device, the identifiers of the plurality of devices in the second window in descending order of frequency of communication with the plurality of devices; or
c) sequentially displaying, by the electronic device, the identifiers of the plurality of devices in the second window in alphabetical order of initial letters of names of the plurality of devices.

8. The display method of claim 1, wherein in the process of receiving the first operation, the method further comprises:
finding, by the electronic device, a new device, wherein one of a) a strength of a signal for communication between the new device and the electronic device is greater than a fifth value, or b) a frequency of communication between the new device and the electronic device is greater than a sixth value, or c) an initial letter of a name of the new device alphabetically precedes an initial letter of a name of a device corresponding to the first identifier; and
displaying, by the electronic device, a fourth identifier of the new device at a fourth position in the second window.

9. An electronic device, comprising:
a processor; and
a non-transitory memory coupled to the processor and storing instructions that, when executed by the processor, cause the electronic device to be configured to:
find a plurality of devices within a first time period;
display a first window and a second window, wherein an identifier of to-be-shared content is displayed in the first window, identifiers corresponding to the plurality of devices are displayed in the second window, and the identifiers of the devices are displayed in the second window in a preset order, wherein the identifiers of the devices comprises a first identifier and a second identifier, and wherein the electronic device is configured to display the first identifier at a first position in the second window, and then display the second identifier at a second position in the second window;
detect a first operation of dragging the identifier of the to-be-shared content to the second window;
stop the display of the first identifier during a process of receiving the first operation;
detect, during the process of receiving the first operation, that a distance between the second identifier and the identifier of the to-be-shared content is less than a first value;
detect a second operation on the second identifier;
share the to-be-shared content with a device corresponding to the second identifier in response to the second operation; and
control, within a second time period from a moment when the electronic device stops the display of the first identifier to a moment when the electronic device detects the second operation, either a) a display position of the second identifier in the second window to remain unchanged, or b) displacement of a display position of the second identifier in the second window to be less than a second value.

10. The electronic device of claim 9, wherein detecting that the distance between the second identifier and the identifier of the to-be-shared content is less than the first value comprises detecting that a degree of overlap between a first hot zone and a second hot zone is greater than a third value, wherein the first hot zone is a region in which the identifier of the to-be-shared content is displayed, and wherein the second hot zone is a region in which the second identifier in the second window is displayed.

11. The electronic device of claim 10, wherein a size of the first hot zone remains unchanged, and a size of the second hot zone remains unchanged or increases as a drag speed of the second operation decreases.

12. The electronic device of claim 9, wherein the electronic device fails to find the device corresponding to the second identifier after the first time period and before the electronic device stops displaying the first identifier.

13. The electronic device of claim 9, wherein the identifiers of the devices further comprise a third identifier, and when the processor executes the instructions, the electronic device is further configured to:
display the third identifier at a third position in the second window after displaying the second identifier at the second position; and
display the third identifier at the first position after stopping the display of the first identifier.

14. The electronic device of claim 9, wherein controlling displacement of the display position of the second identifier in the second window to be less than the second value comprises:
controlling a movement speed of the second identifier at the display position in the second window to be less than a fourth value after the electronic device stops the display of the first identifier; and
controlling, when detecting the second operation, the displacement of the display position of the second identifier in the second window to be less than the second value.

15. The electronic device of claim 9, wherein displaying the identifiers of the devices in the second window in the preset order comprises one of:
a) sequentially displaying the identifiers of the plurality of devices in the second window in descending order of strength of signals for communication with the plurality of devices; or
b) sequentially displaying the identifiers of the plurality of devices in the second window in descending order of frequency of communication with the plurality of devices; or c) sequentially displaying the identifiers of the plurality of devices in the second window in alphabetical order of initial letters of names of the plurality of devices.

16. The electronic device of claim 9, wherein when the processor executes the instructions in the process of receiving the first operation, the electronic device is further configured to:
   find a new device, wherein one of a) a strength of a signal for communication between the new device and the electronic device is greater than a fifth value, or b) a frequency of communication between the new device and the electronic device is greater than a sixth value, or c) an initial letter of a name of the new device alphabetically precedes an initial letter of a name of a device corresponding to the first identifier; and
   display a fourth identifier of the new device at a fourth position in the second window.

17. A non-transitory computer-readable storage medium storing instructions that, when executed by a processor of an electronic device, cause the electronic device to be configured to:
   find a plurality of devices within a first time period;
   display a first window and a second window, wherein an identifier of to-be-shared content is displayed in the first window, identifiers corresponding to the plurality of devices are displayed in the second window, and the identifiers of the devices are displayed in the second window in a preset order, wherein the identifiers of the devices comprises a first identifier and a second identifier, and wherein the electronic device is configured to display the first identifier at a first position in the second window, and then display the second identifier at a second position in the second window;
   detect a first operation of dragging the identifier of the to-be-shared content to the second window;
   stop the display of the first identifier during a process of receiving the first operation;
   detect, during the process of receiving the first operation, that a distance between the second identifier and the identifier of the to-be-shared content is less than a first value;
   detect a second operation on the second identifier;
   share the to-be-shared content with a device corresponding to the second identifier in response to the second operation; and
   control, within a second time period from a moment when the electronic device stops the display of the first identifier to a moment when the electronic device detects the second operation, either a) a display position of the second identifier in the second window to remain unchanged, or b) displacement of a display position of the second identifier in the second window to be less than a second value.

18. The non-transitory computer-readable medium of claim 17, wherein detecting that the distance between the second identifier and the identifier of the to-be-shared content is less than the first value comprises detecting that a degree of overlap between a first hot zone and a second hot zone is greater than a third value, wherein the first hot zone is a region in which the identifier of the to-be-shared content is displayed, and wherein the second hot zone is a region in which the second identifier in the second window is displayed.

19. The non-transitory computer-readable medium of claim 18, wherein a size of the first hot zone remains unchanged, and a size of the second hot zone remains unchanged or increases as a drag speed of the second operation decreases.

20. The non-transitory computer-readable medium of claim 17, wherein the electronic device fails to find the device corresponding to the second identifier after the first time period and before the electronic device stops displaying the first identifier.

* * * * *